Figure 3:
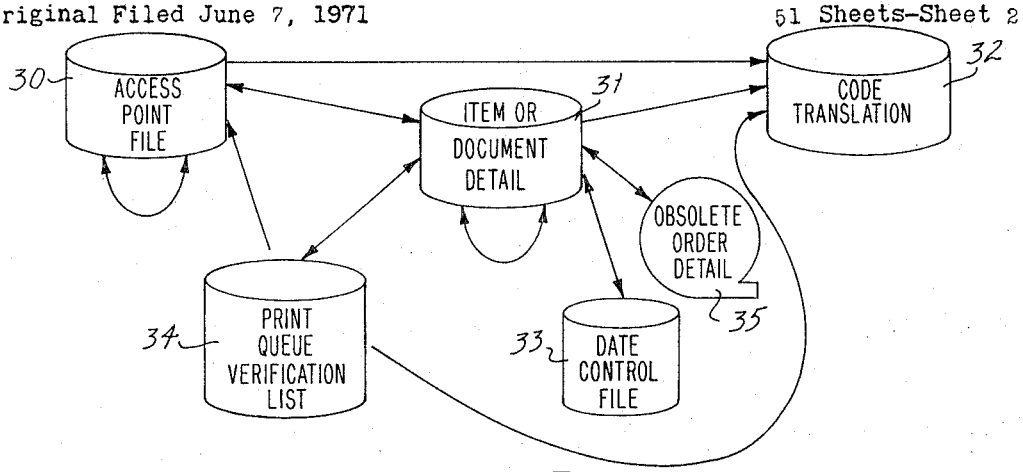
Figure 4:
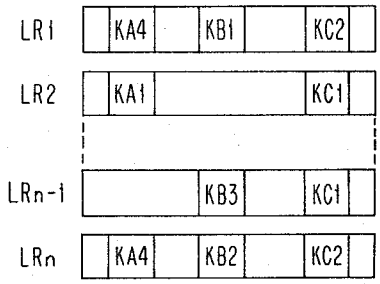
Figure 5:
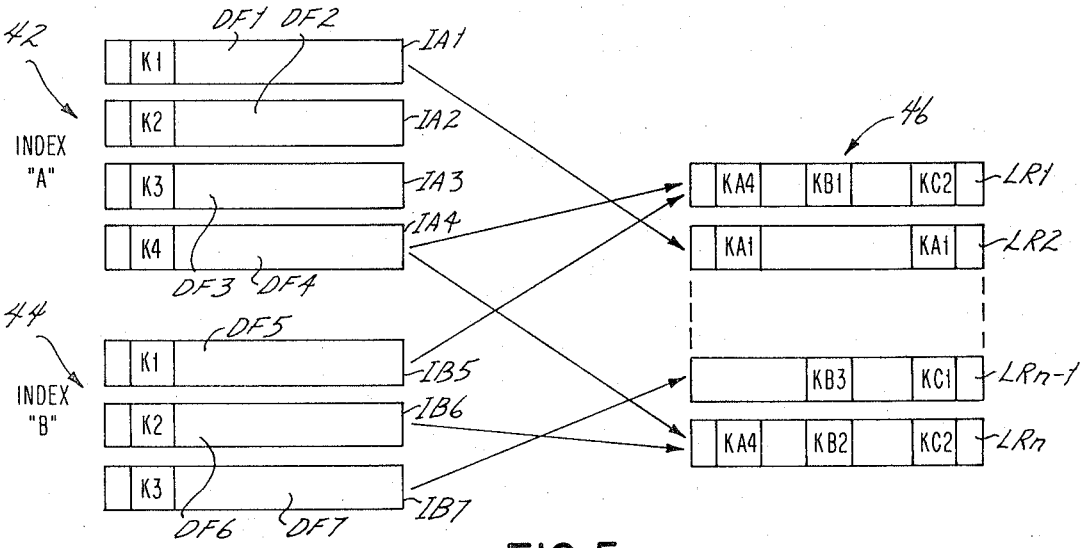
Figure 6:
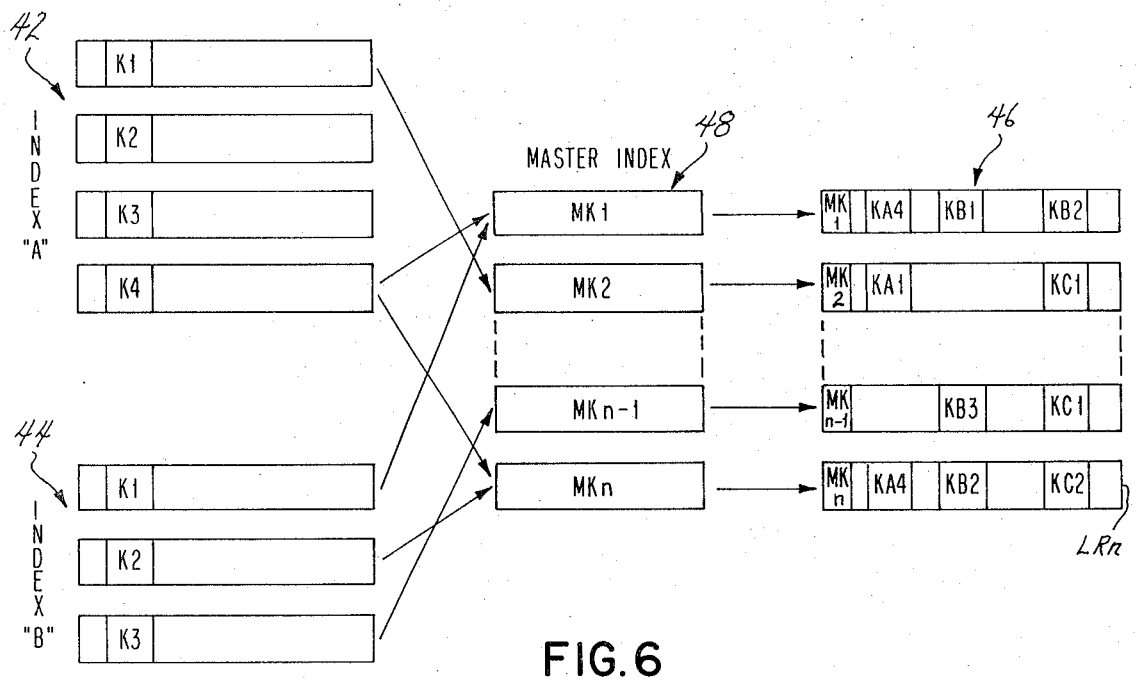
Figure 7:
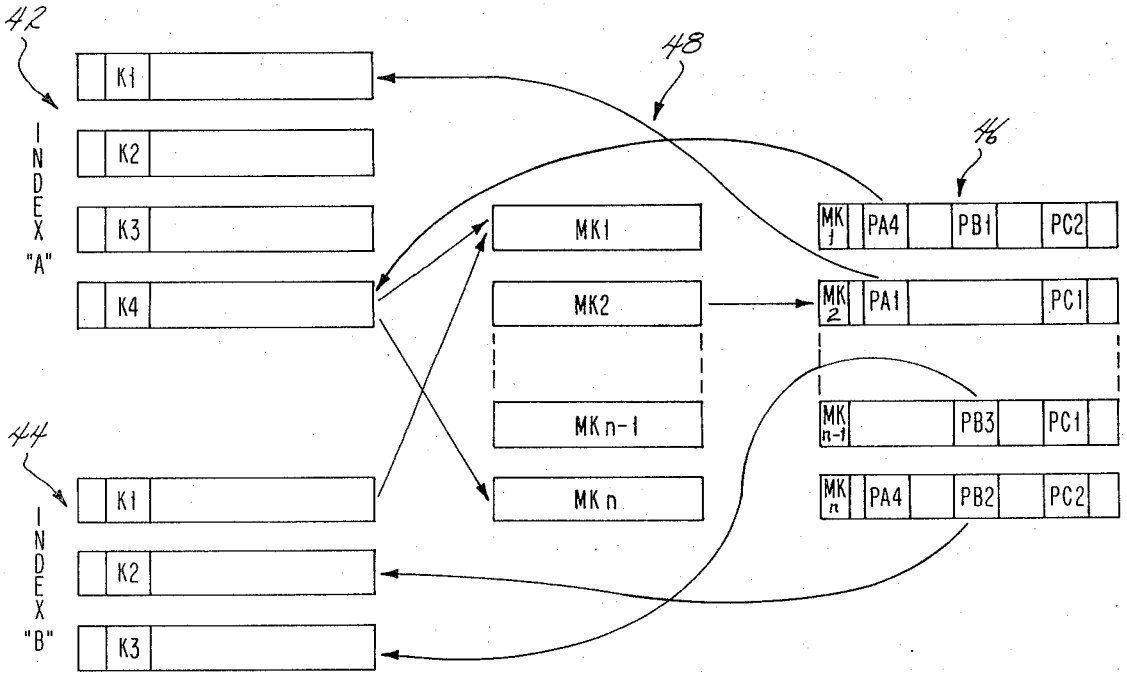
Figure 8:
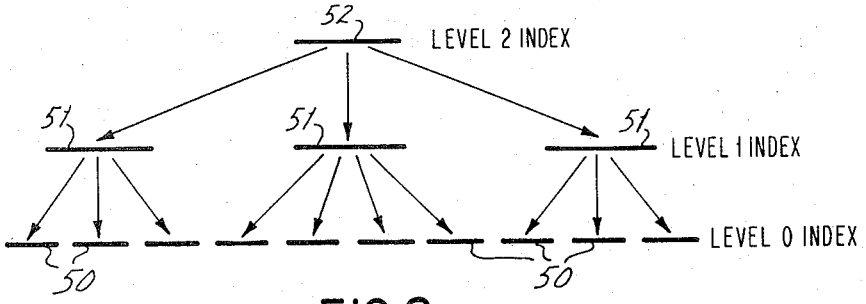
Figure 9:
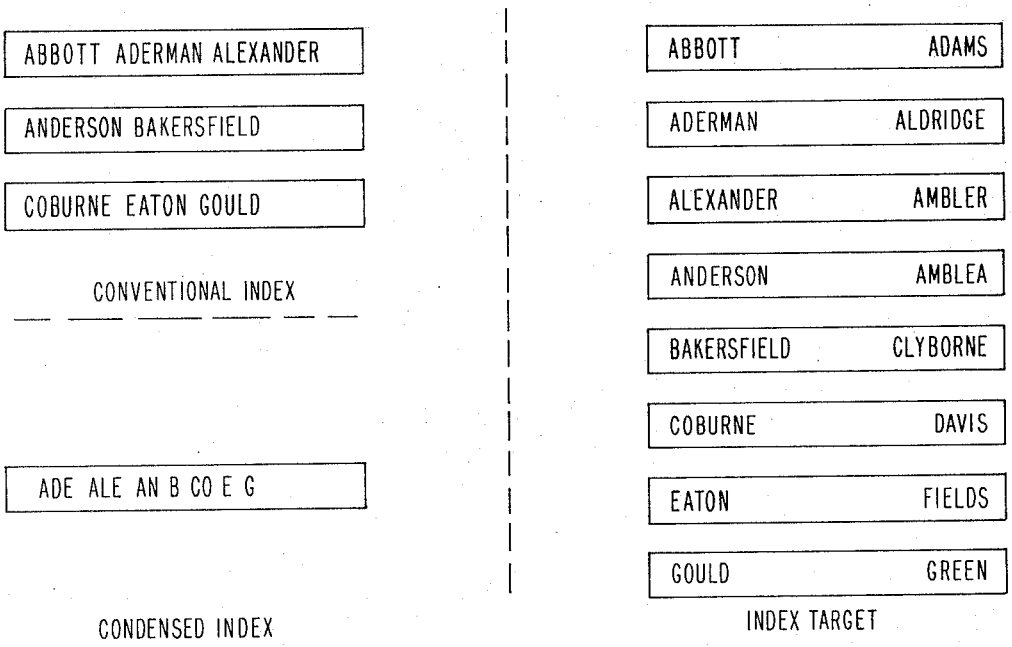
Figure 10:
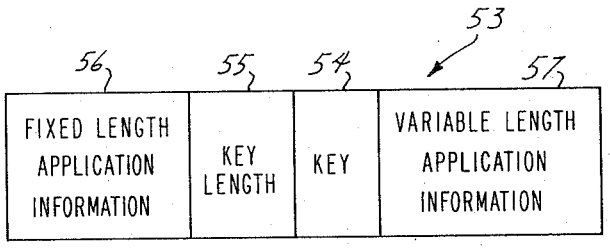
Figure 11:
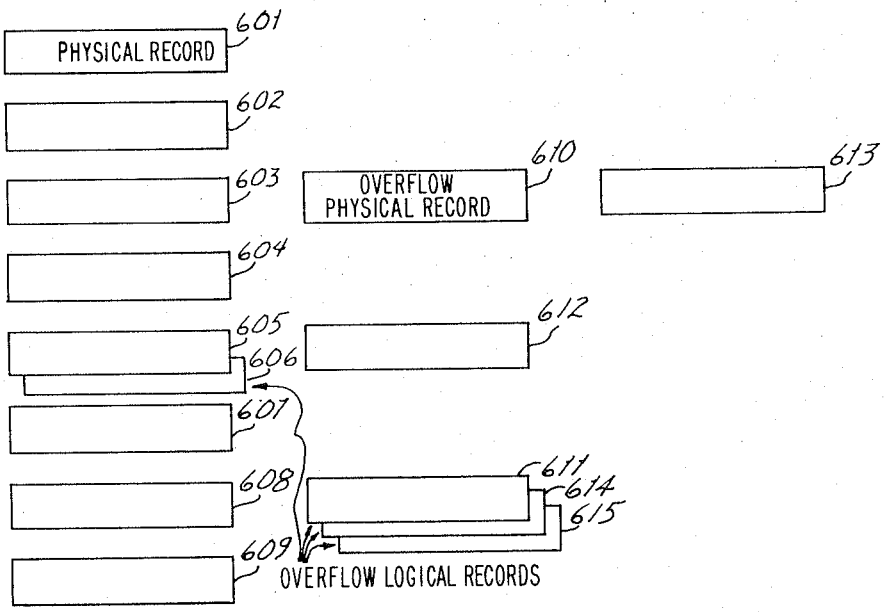
Figure 14:
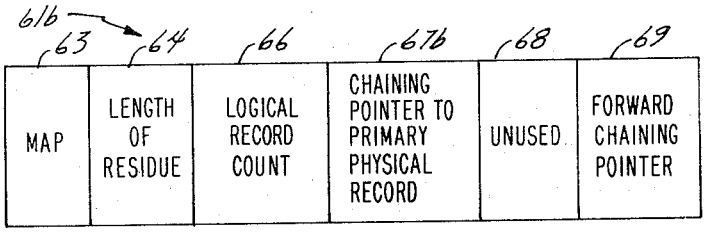
Figure 15:
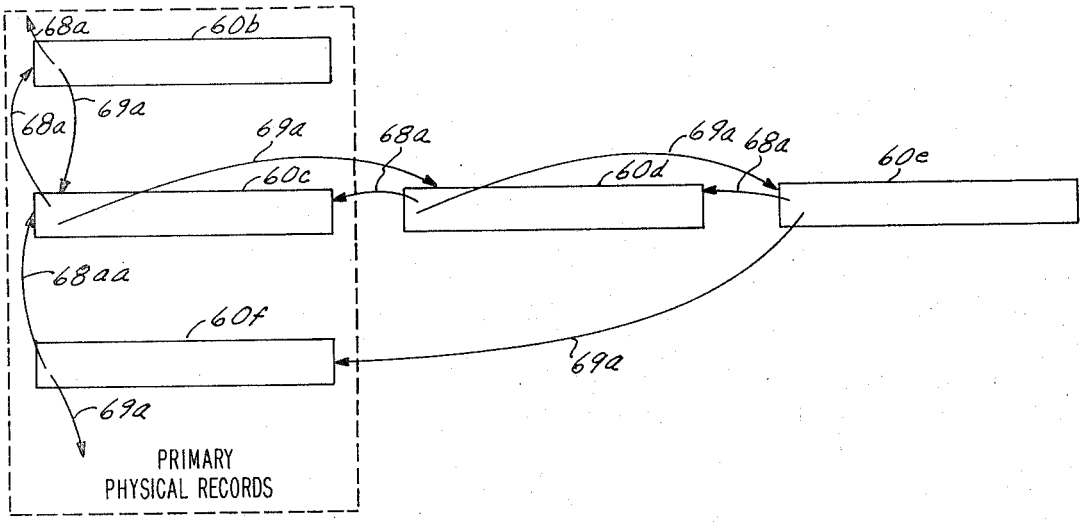
Figure 12:
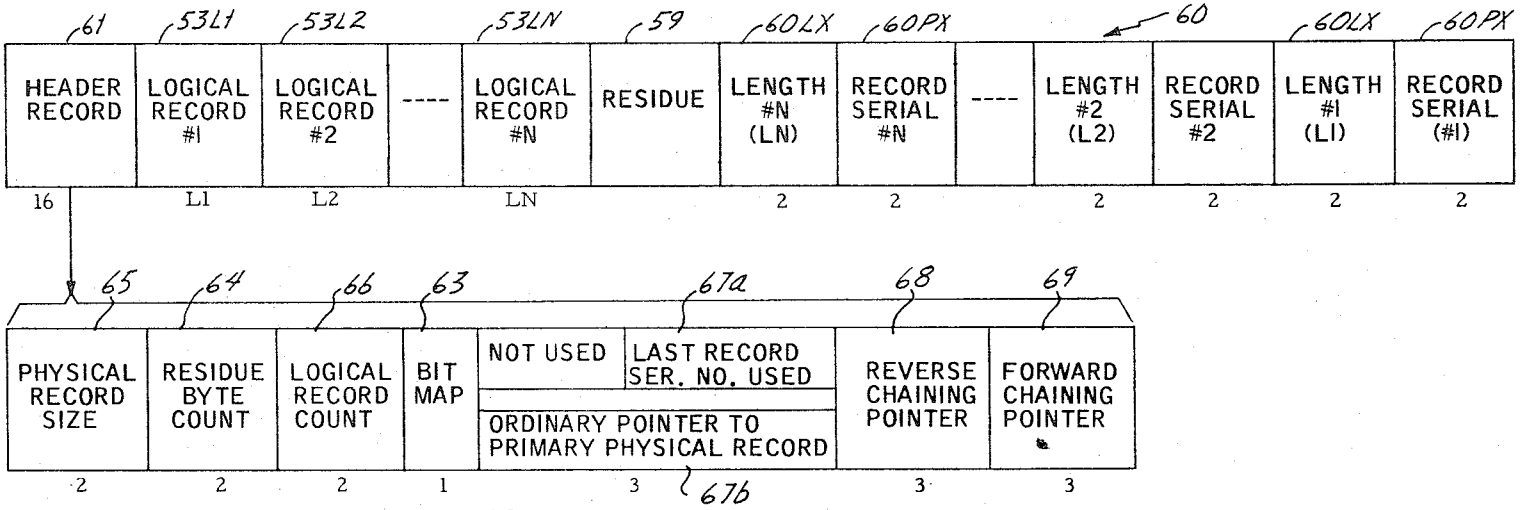
Figure 13:
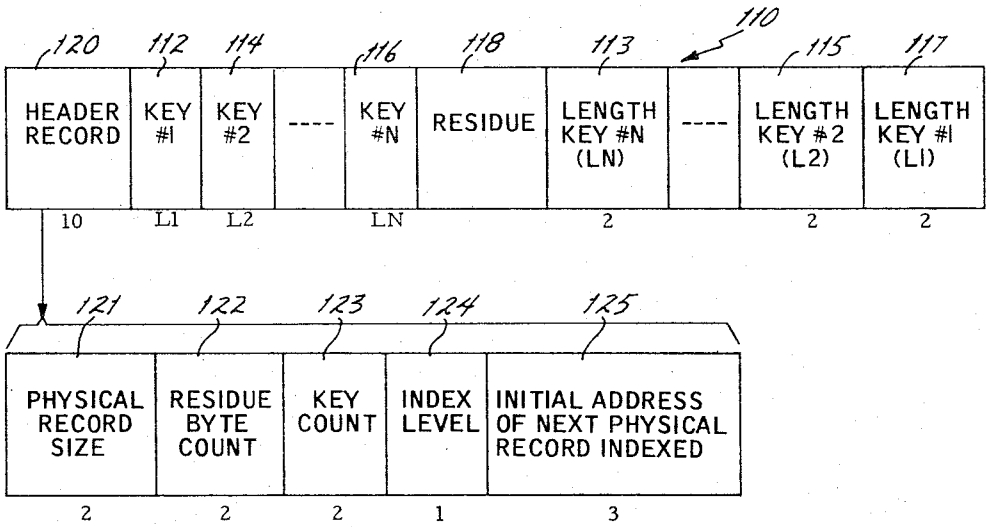
Figure 16:
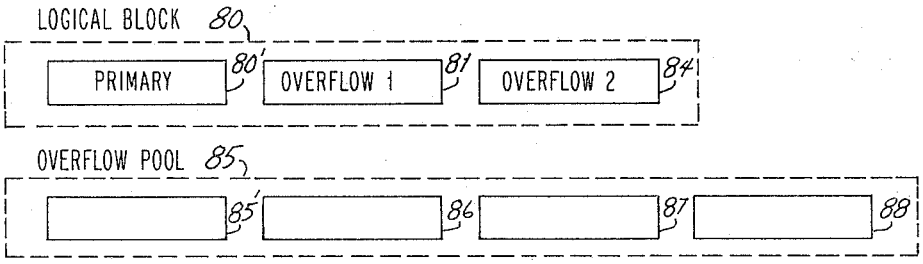
Figure 17:
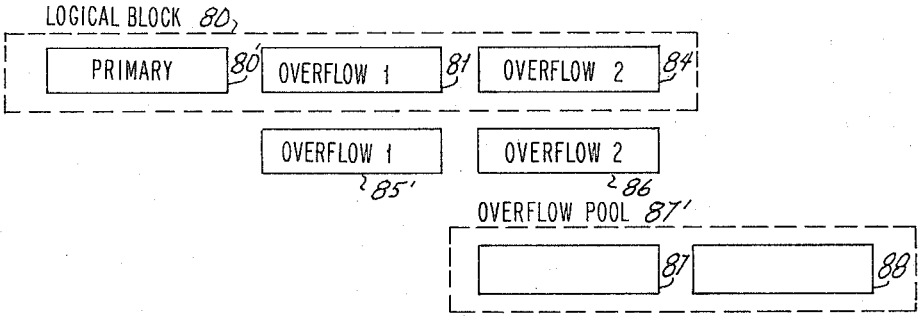
Figure 18:
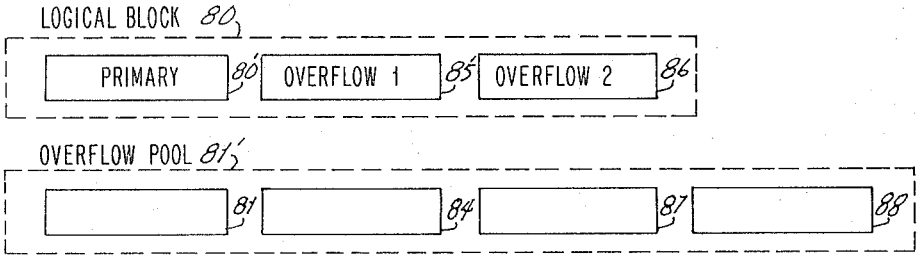
Figure 19:
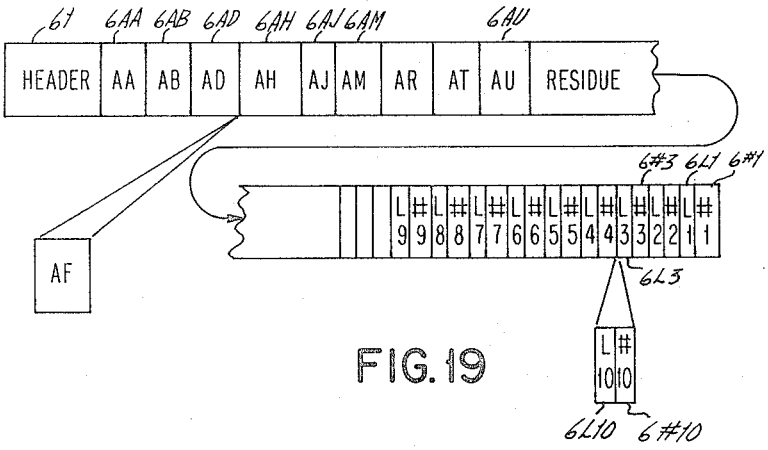
Figure 20:
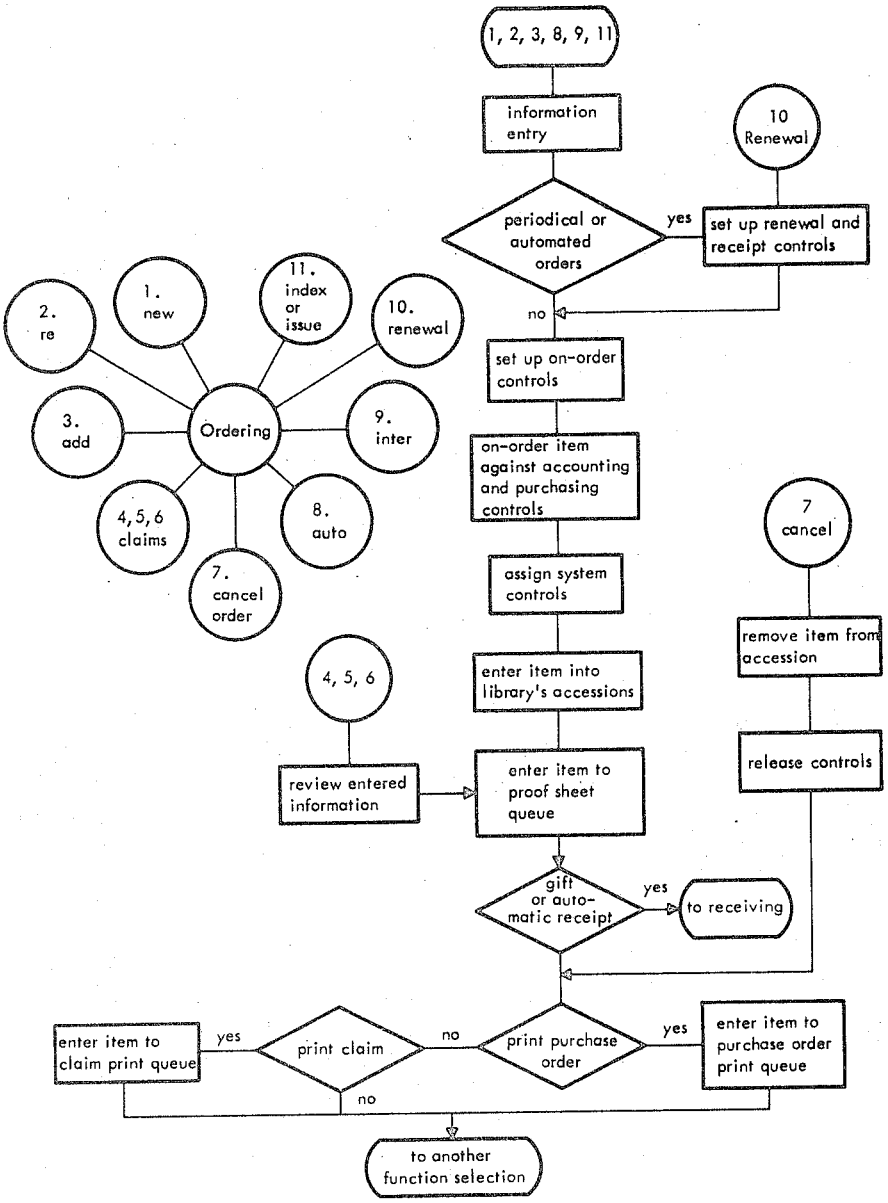
Figure 23:
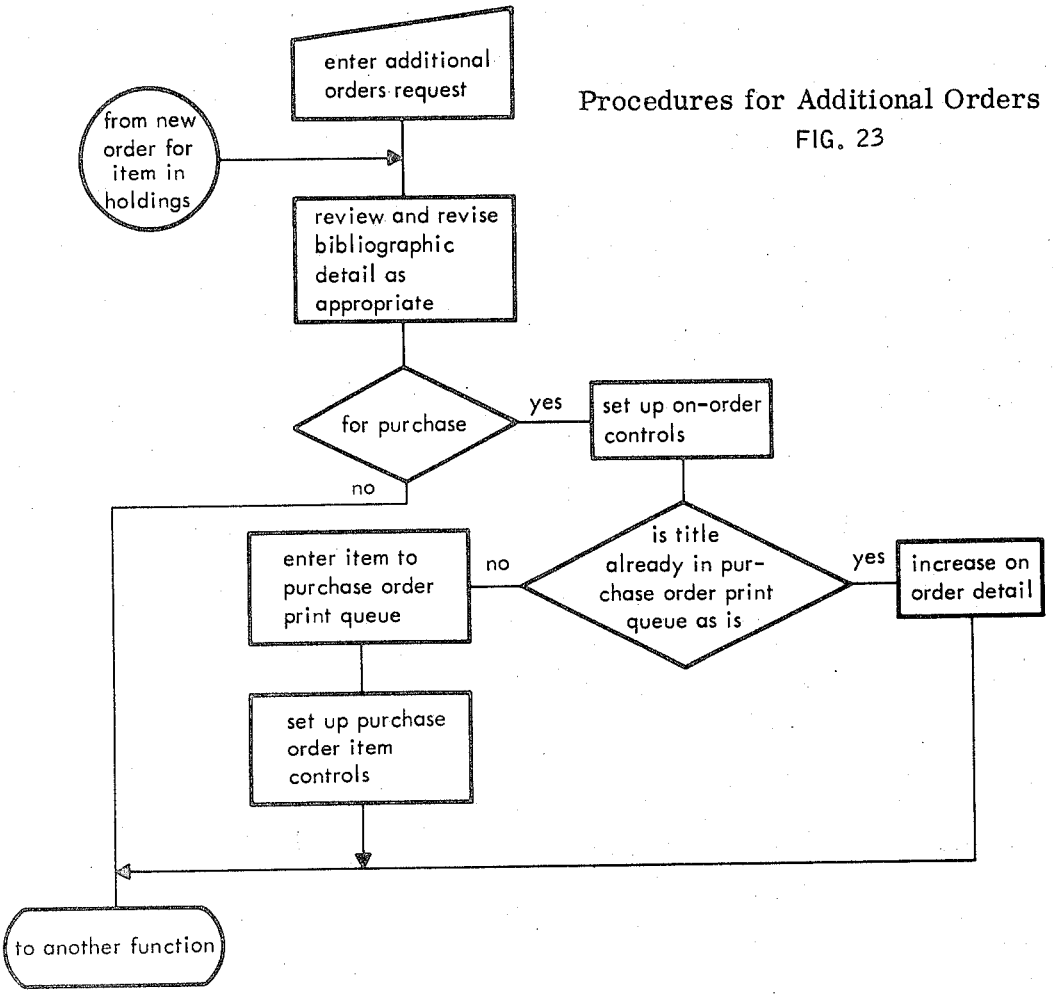
Figure 24:
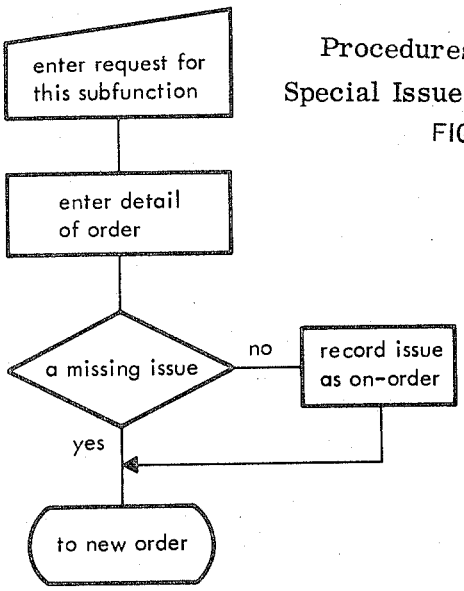
Figure 25:
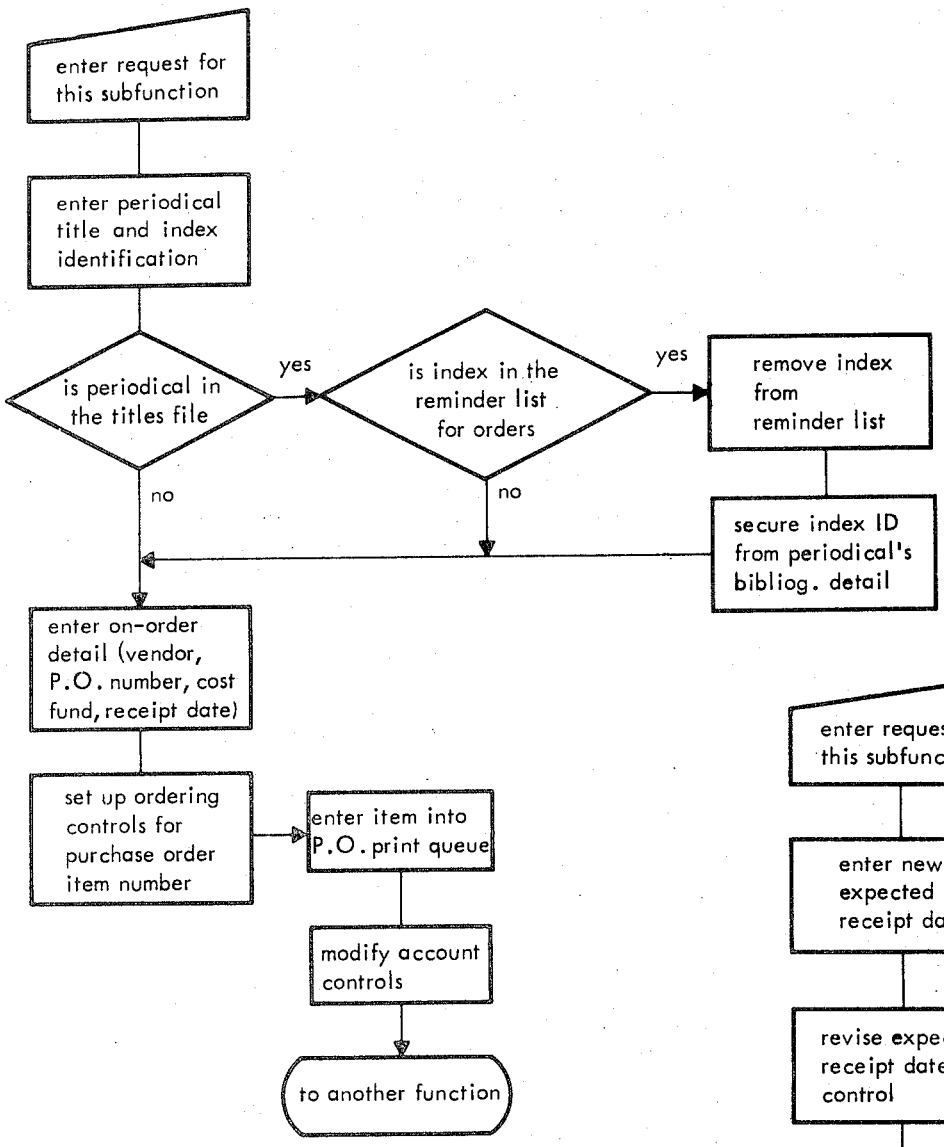
Figure 26:
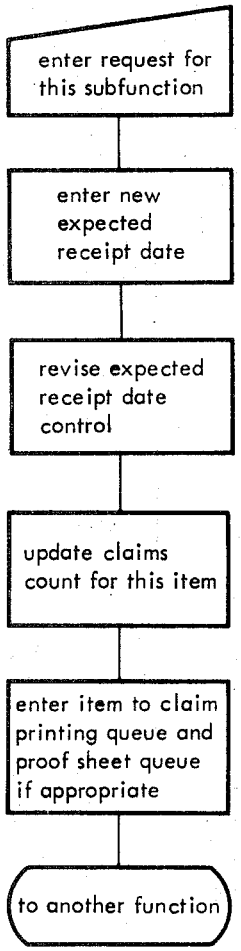
Figure 27:
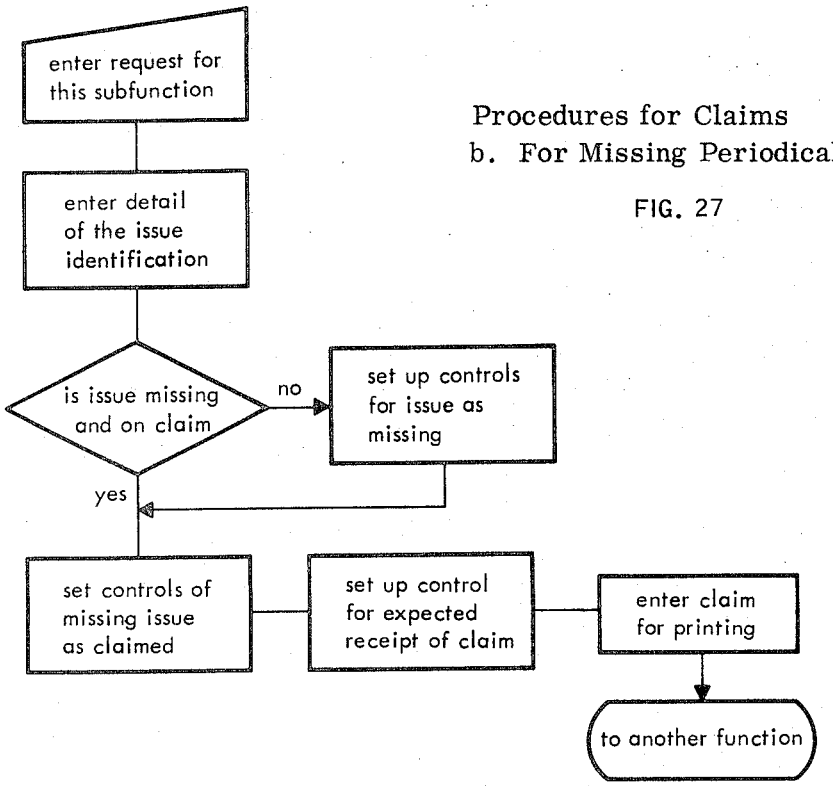
Figure 28:
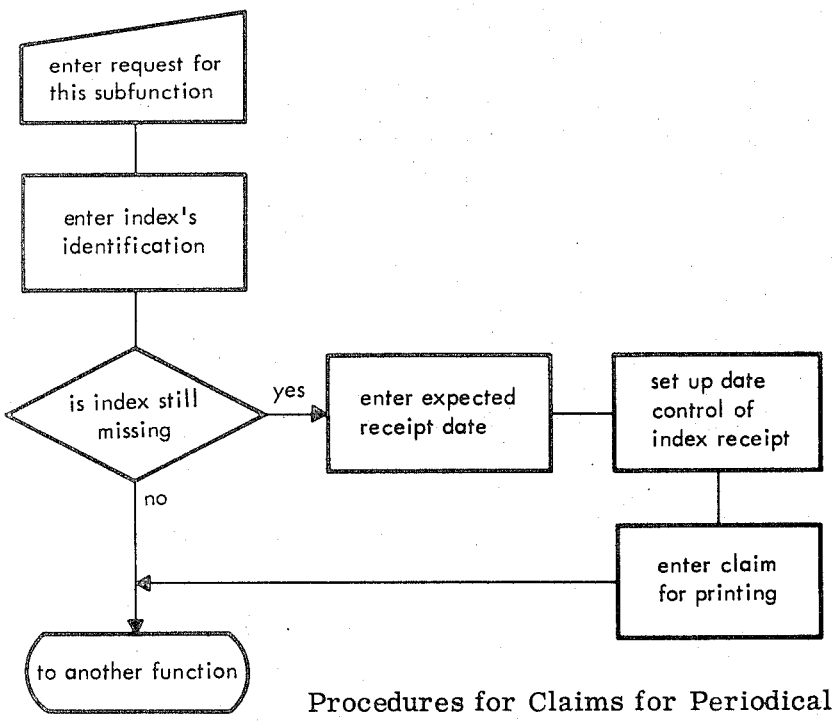
Figure 29:
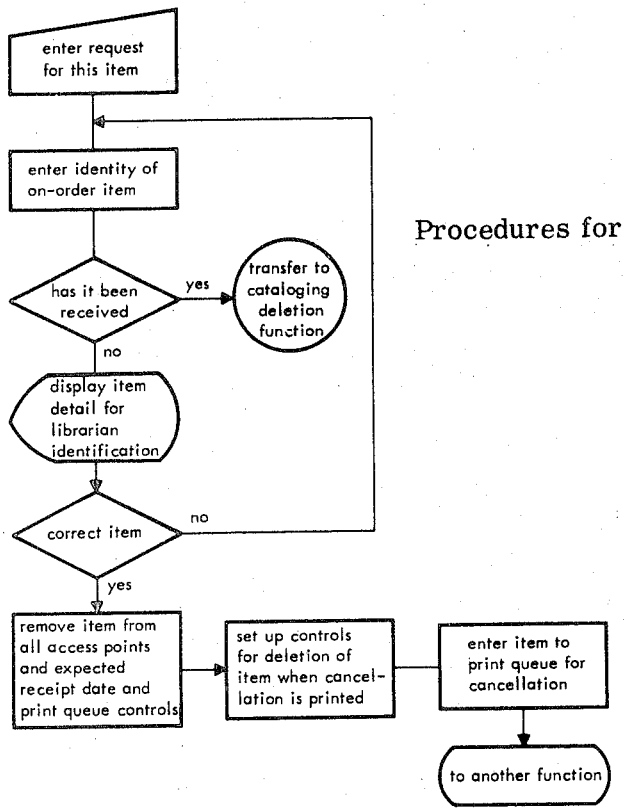
Figure 30:
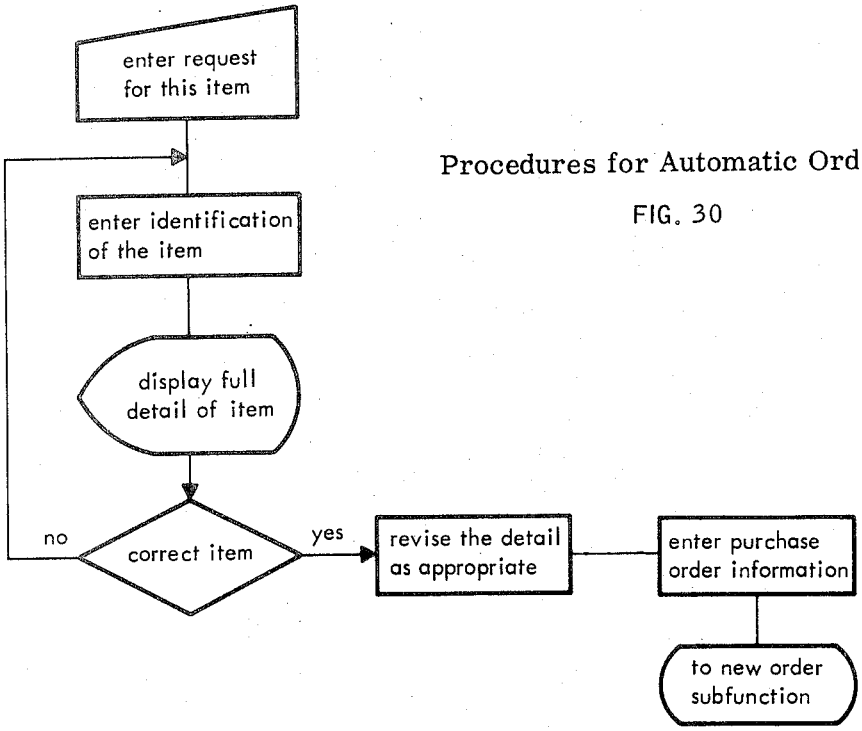
Figure 34:
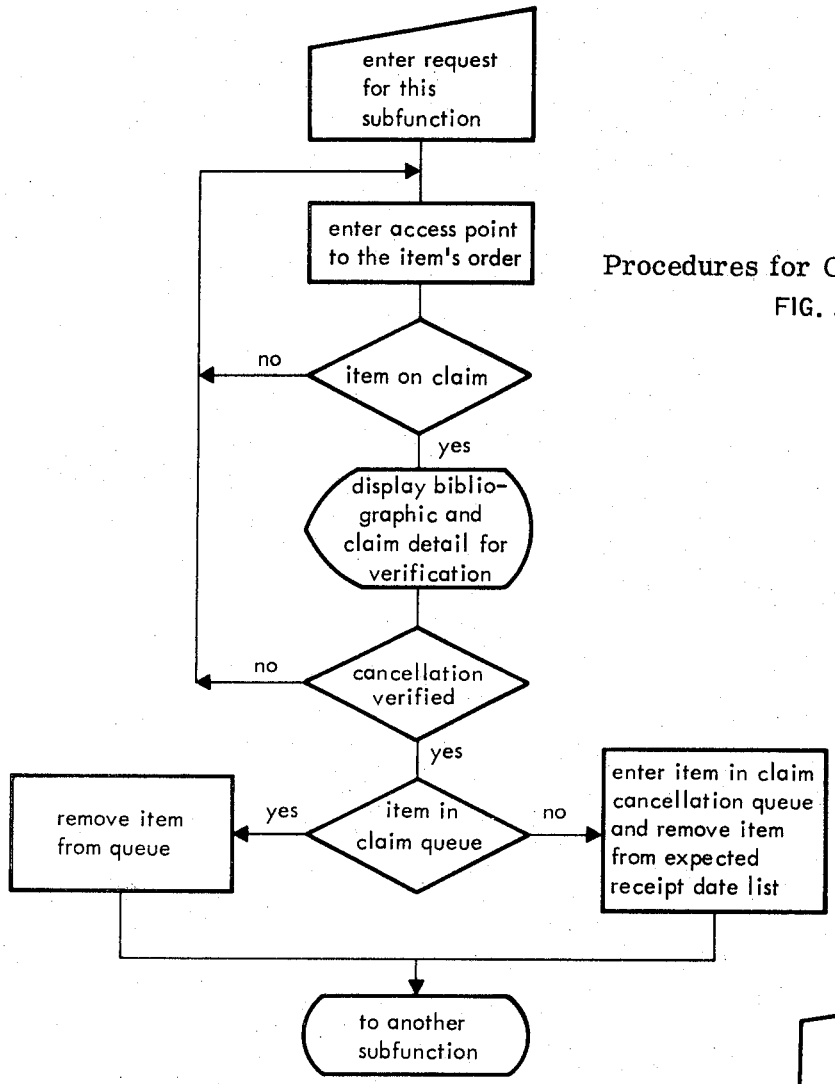
Figure 35:
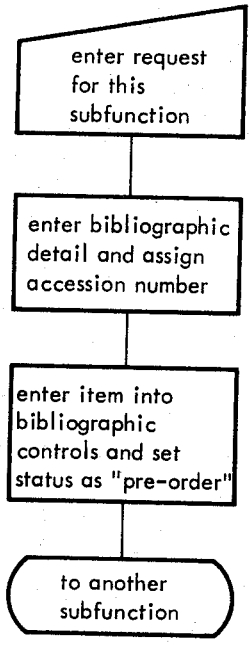
Figure 36:
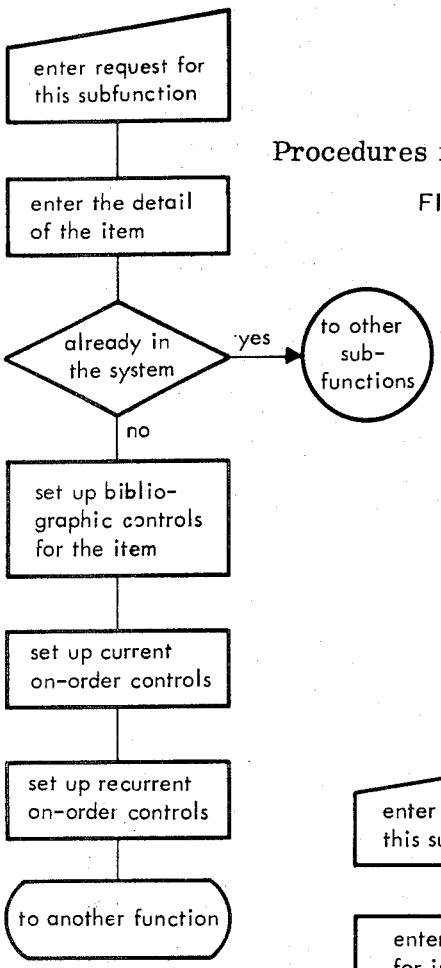
Figure 37:
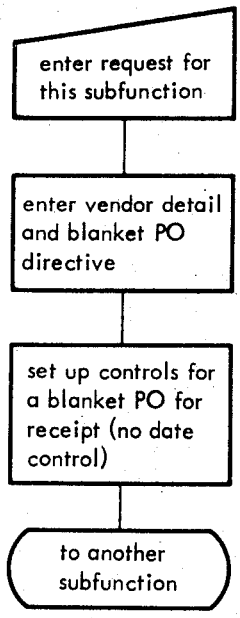
Figure 38:
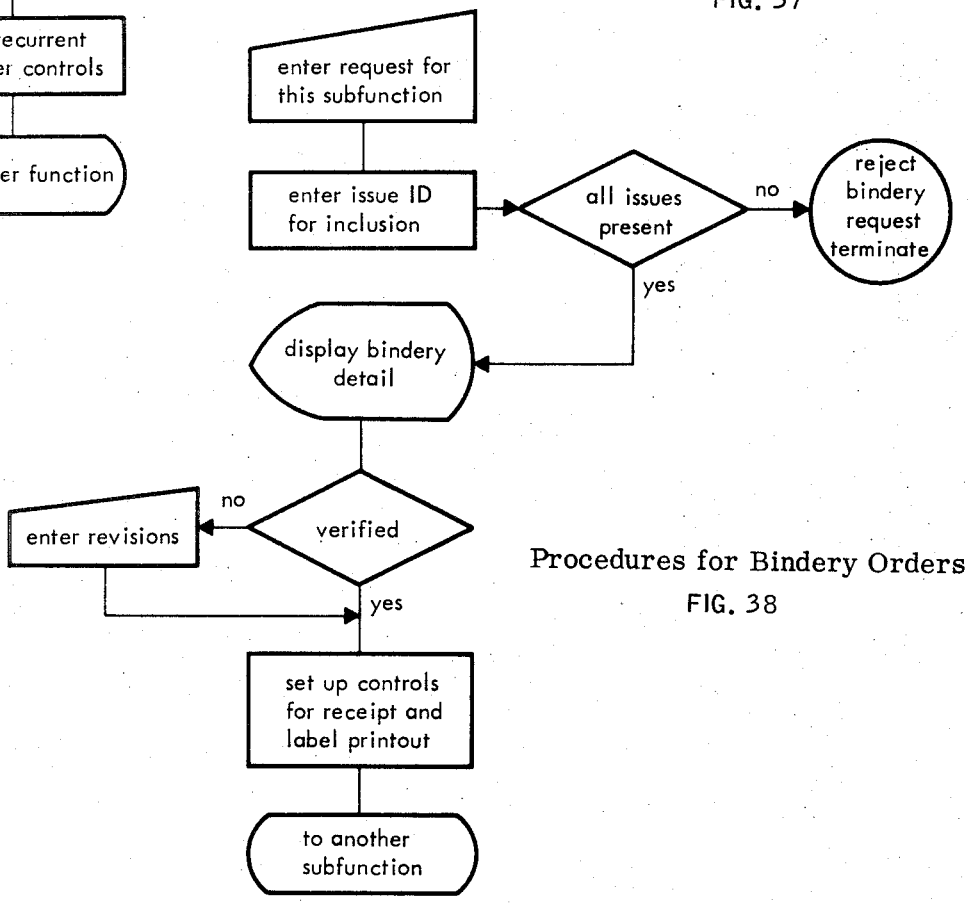
Figure 39:
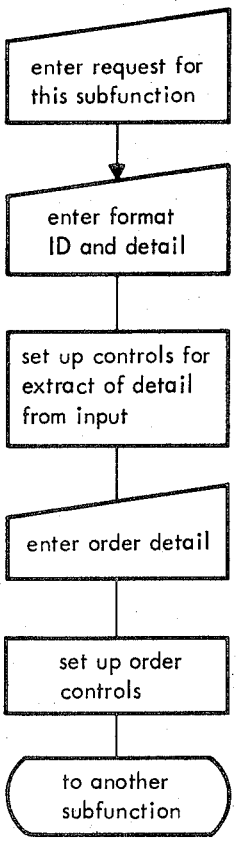
Figure 40:
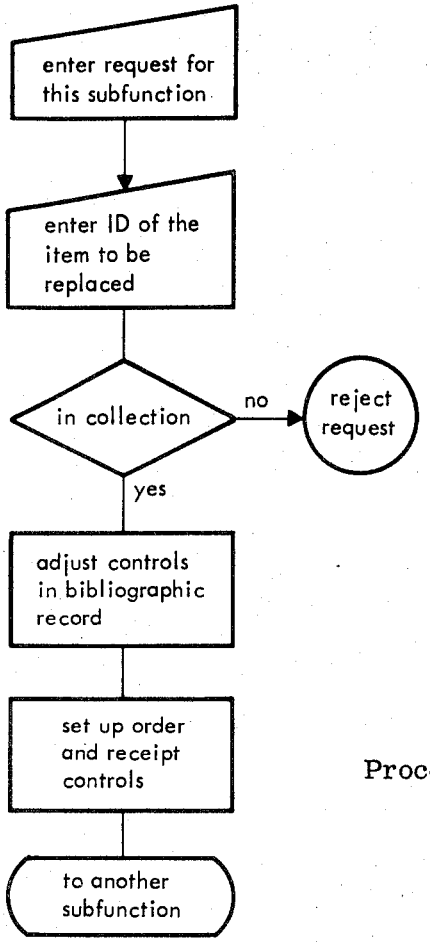
Figure 41:
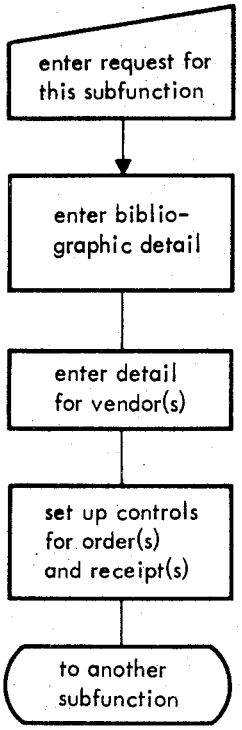
Figure 42:
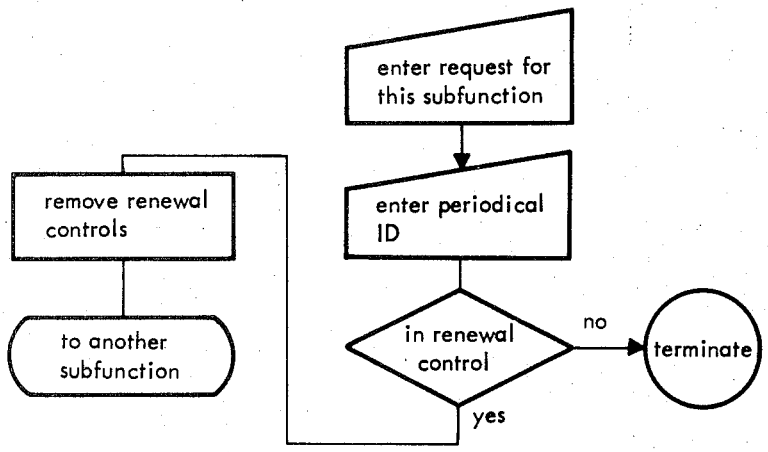
Figure 43:
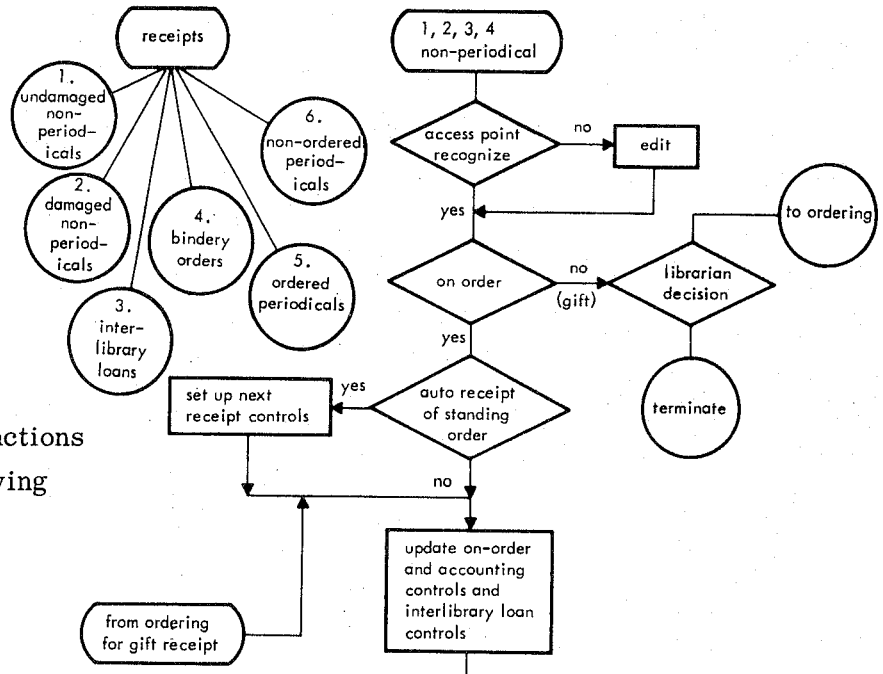
Figure 44:
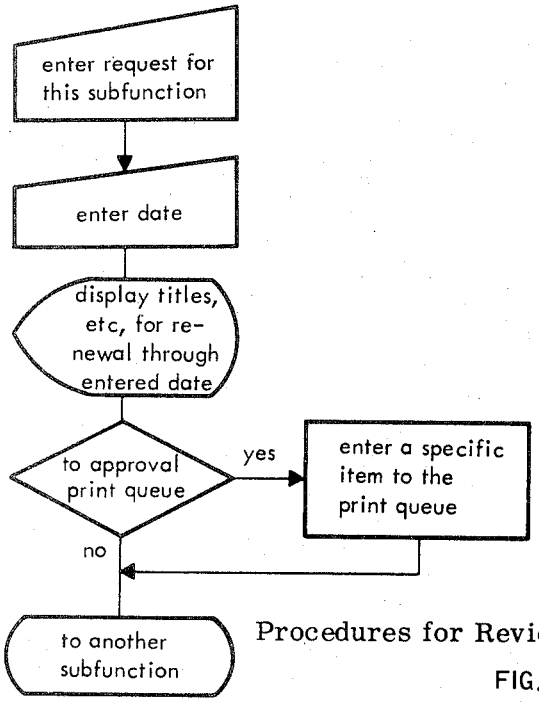
Figure 45:
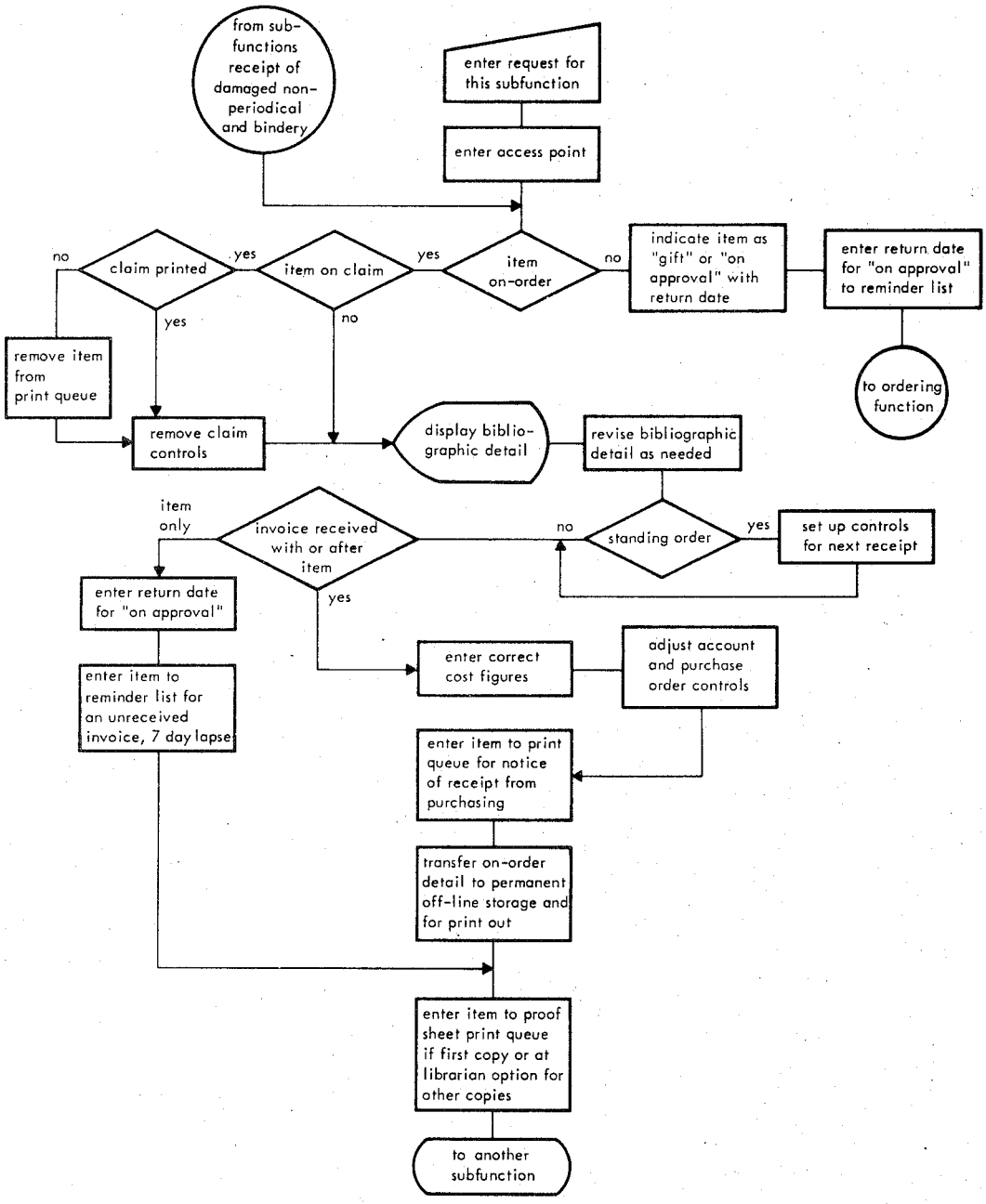
Figure 46:
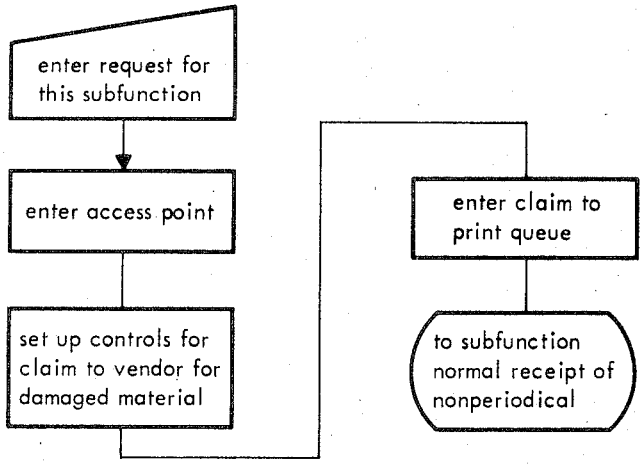
Figure 47:
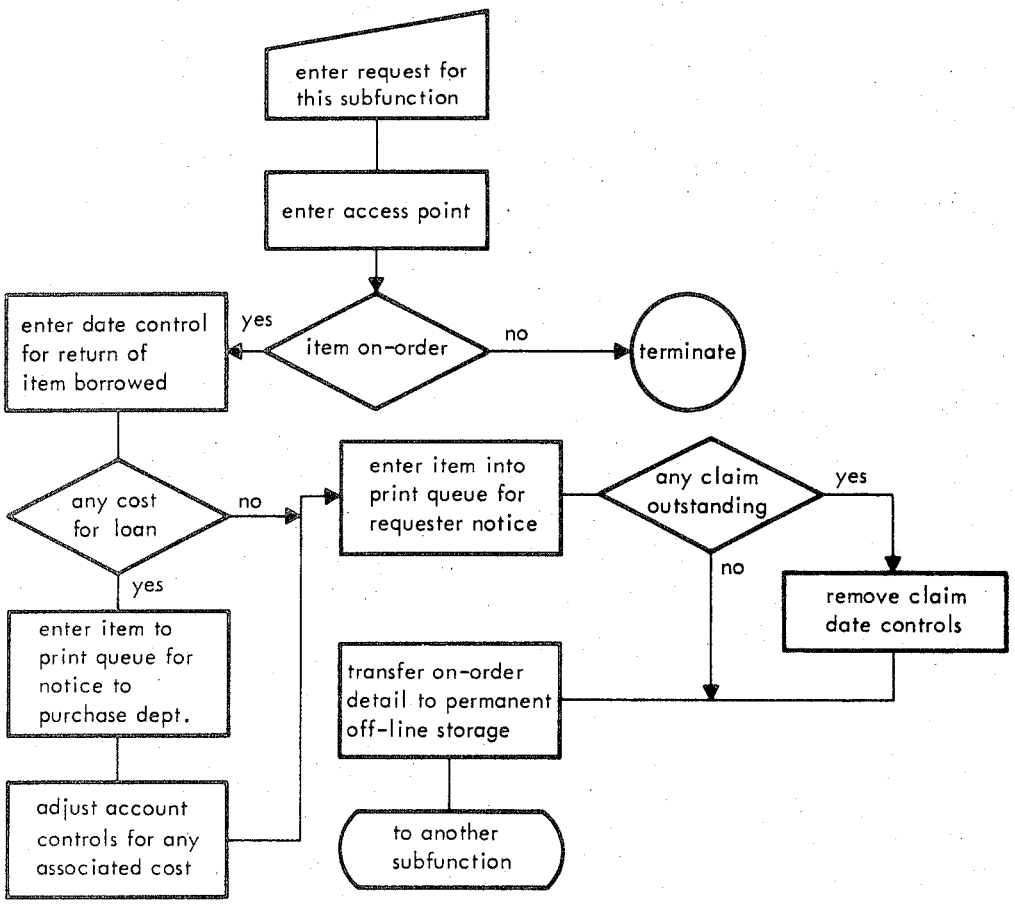
Figure 48:
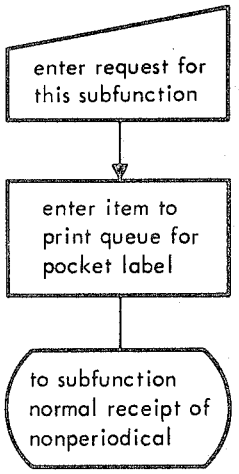
Figure 50:
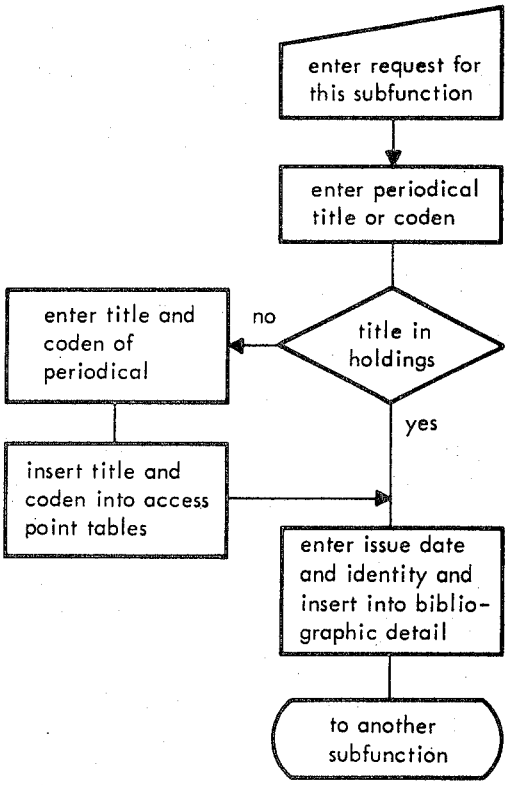
Figure 51:
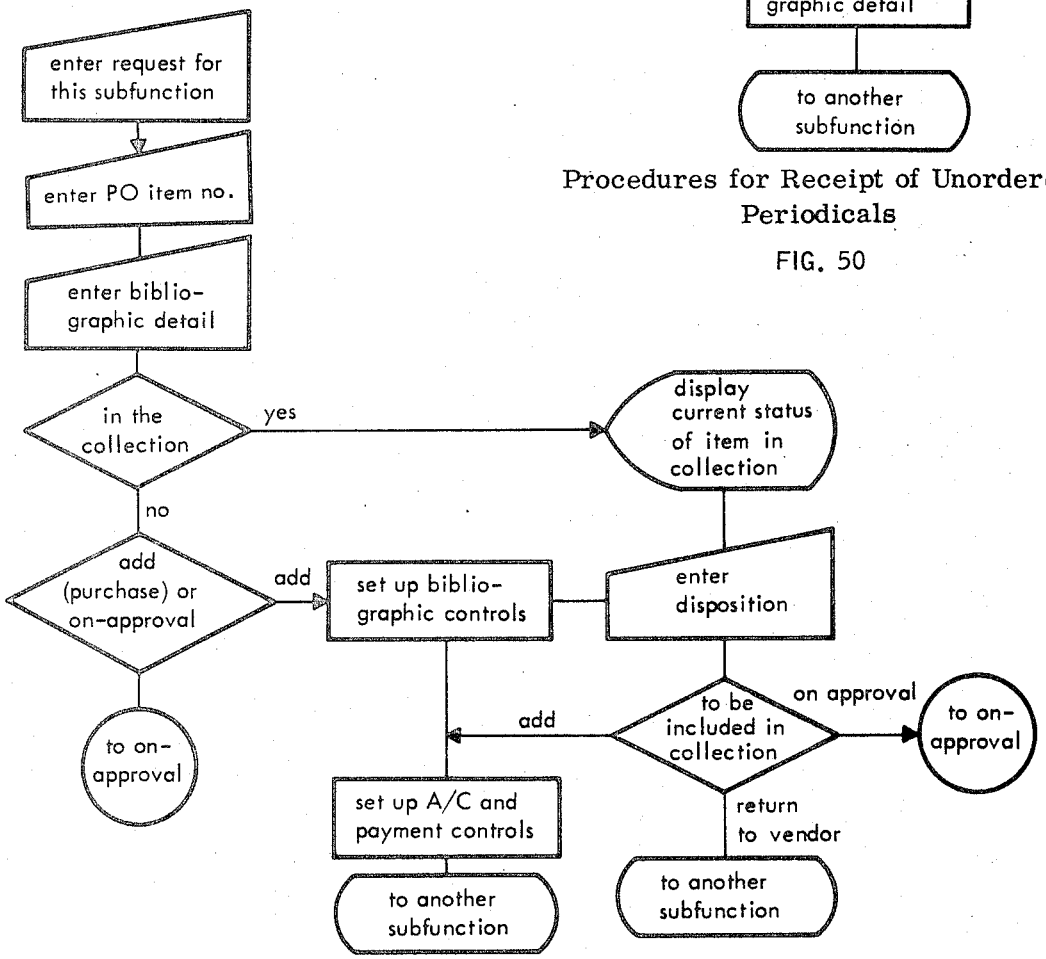
Figure 49:
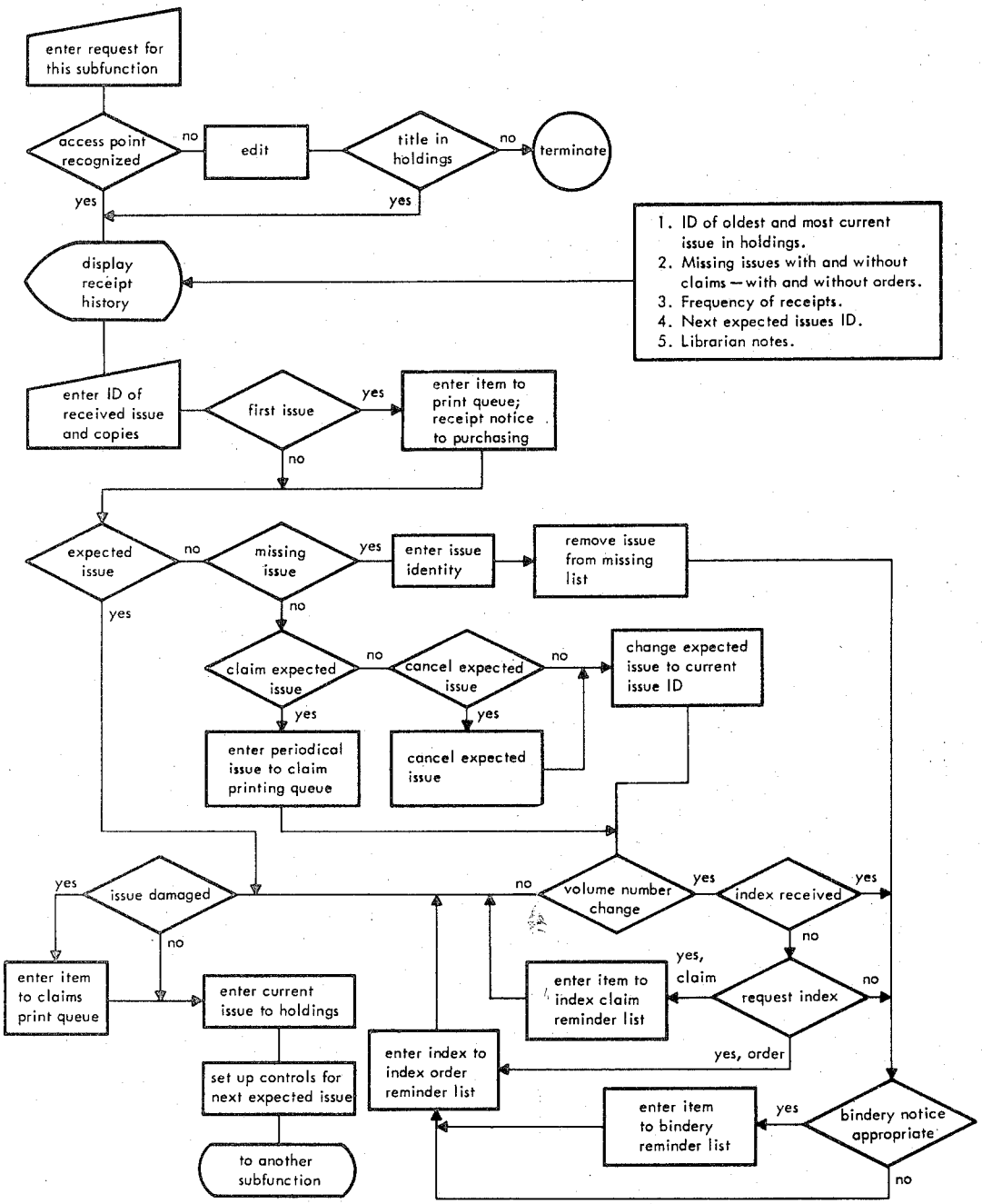
Figure 52:
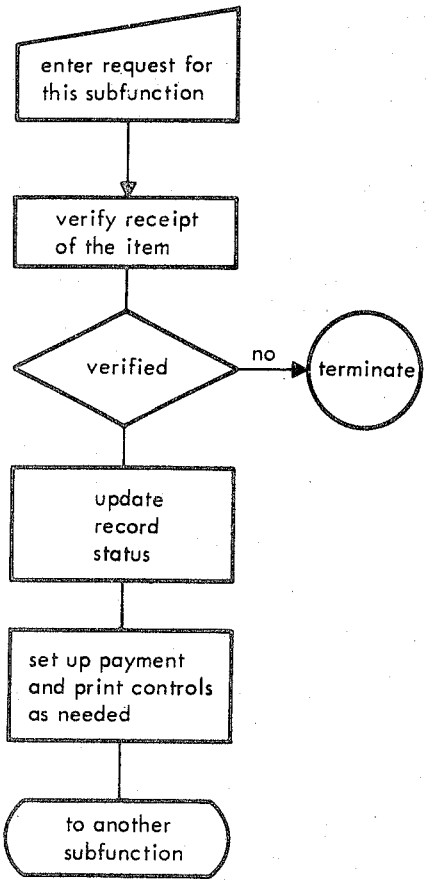
Figure 53:
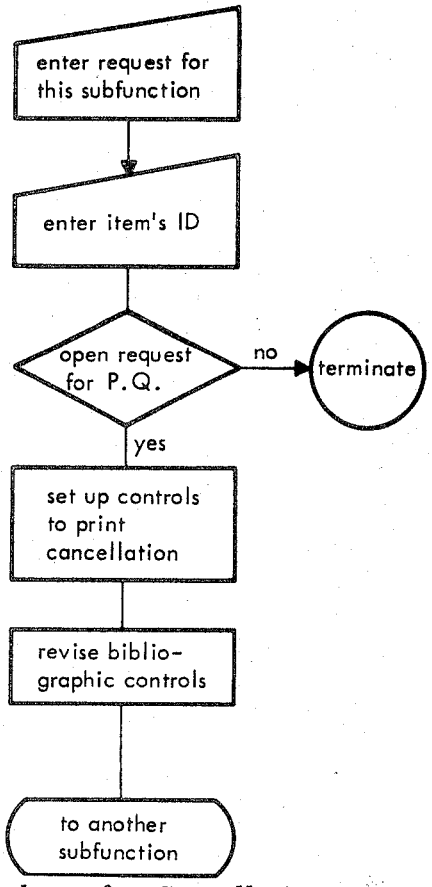
Figure 54:
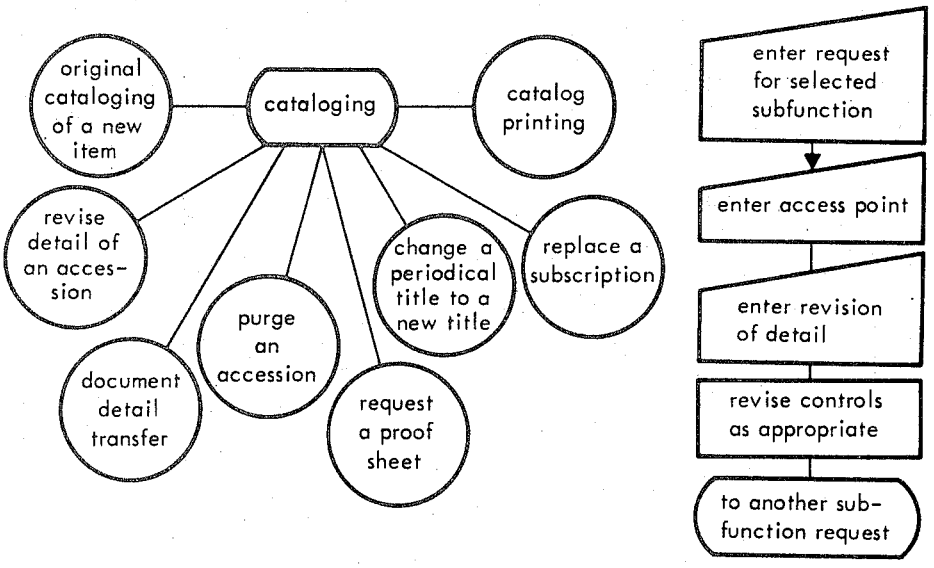
Figure 55:
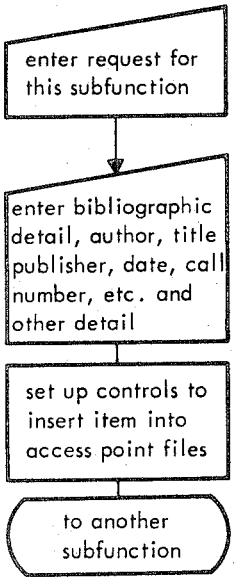
Figure 56:
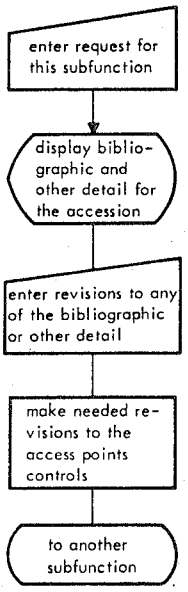
Figure 57:
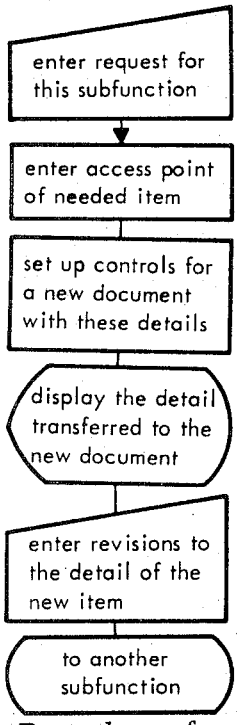
Figure 58:
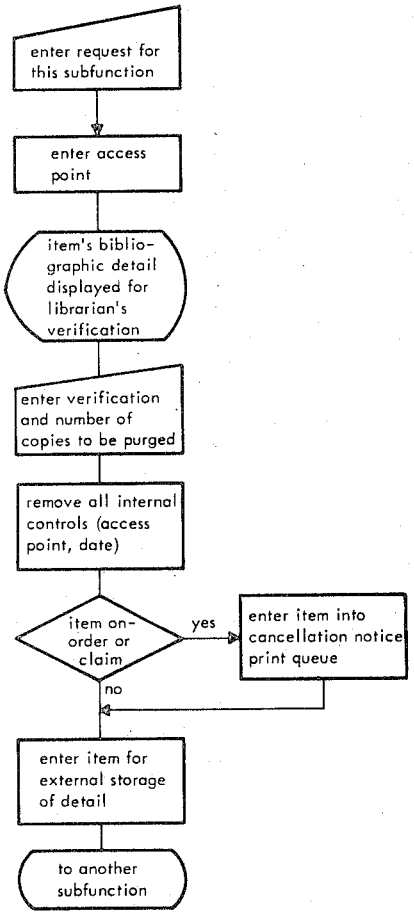
Figure 59:
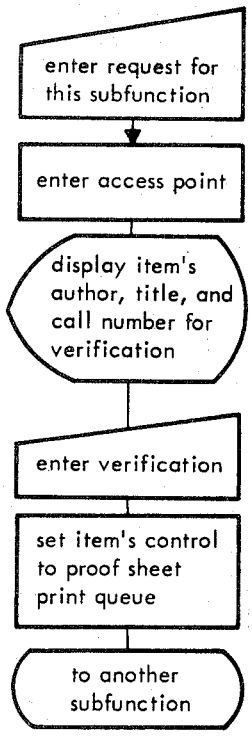
Figure 60:
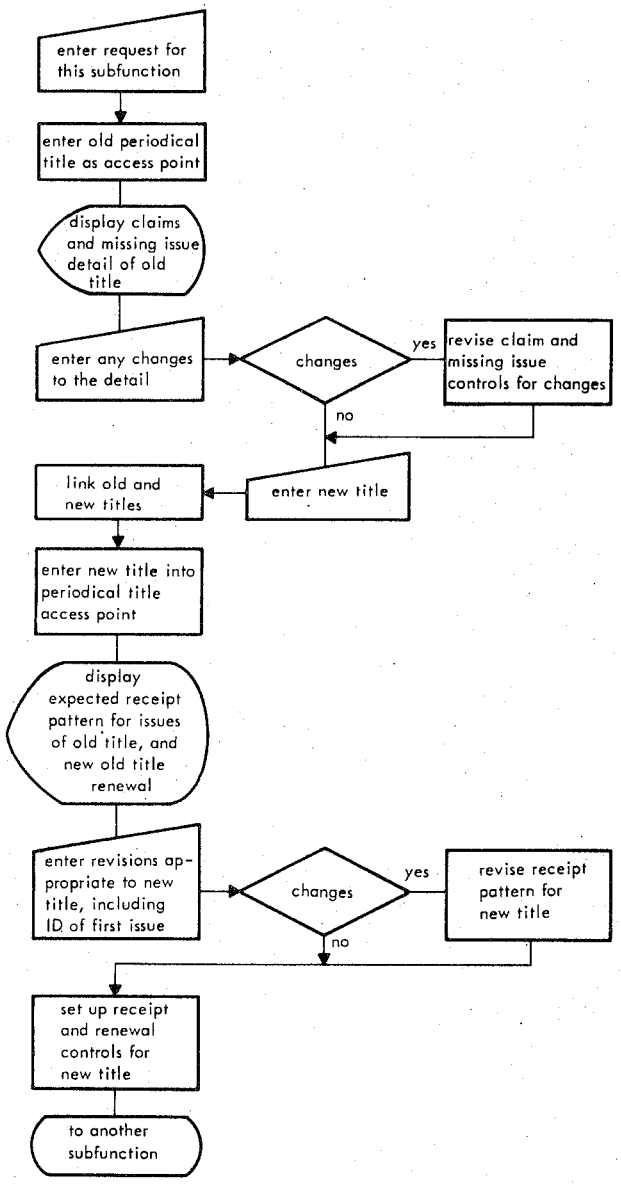
Figure 61:
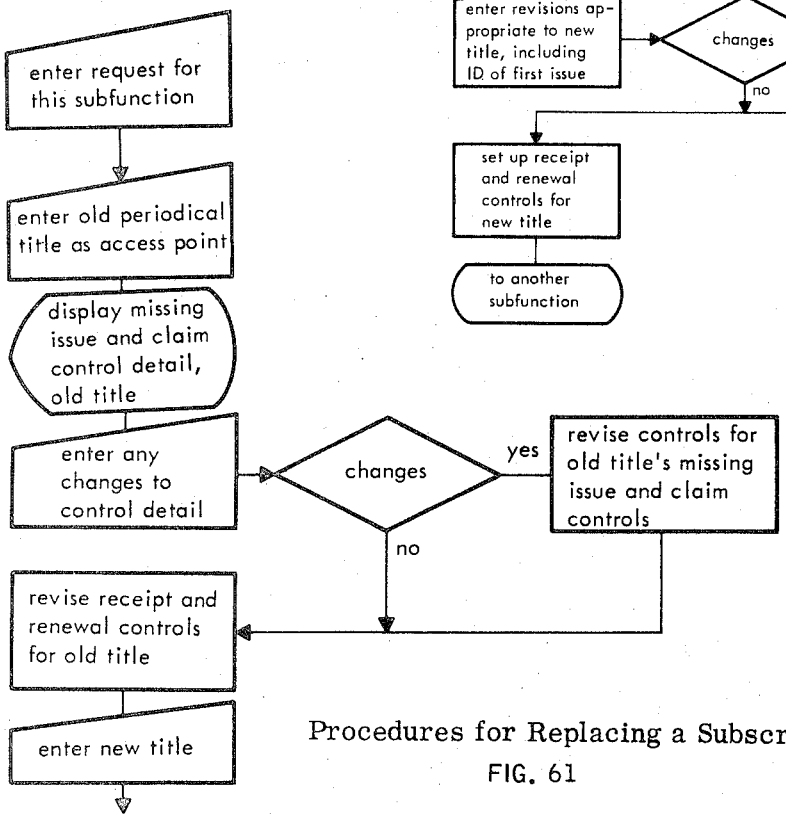
Figure 62:
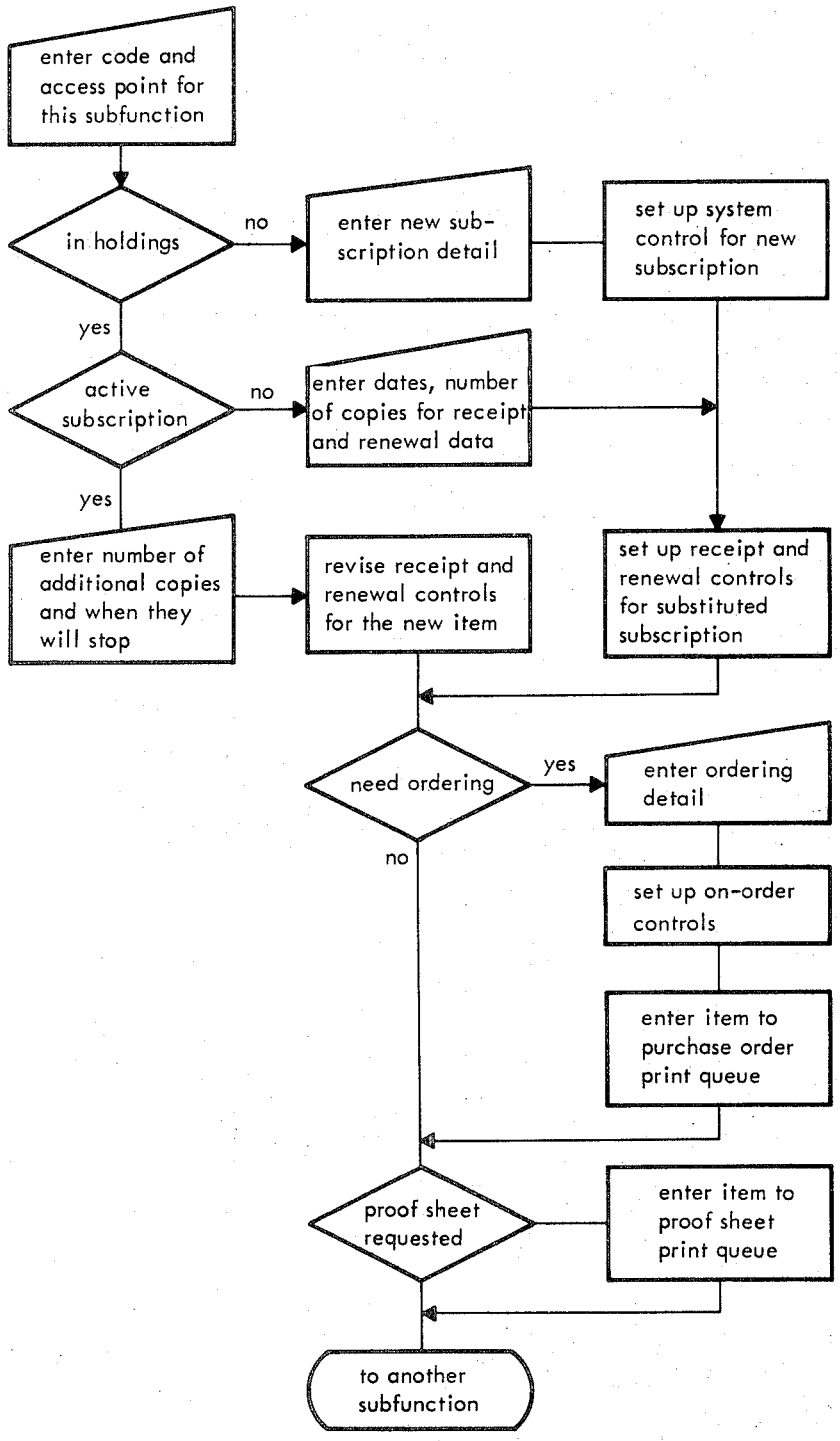
Figure 63:
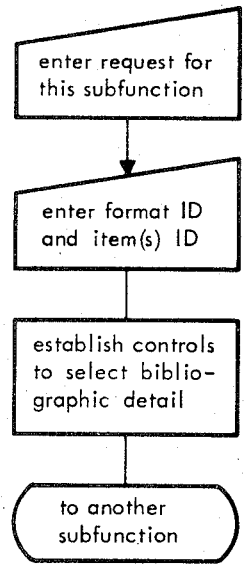
Figure 64:
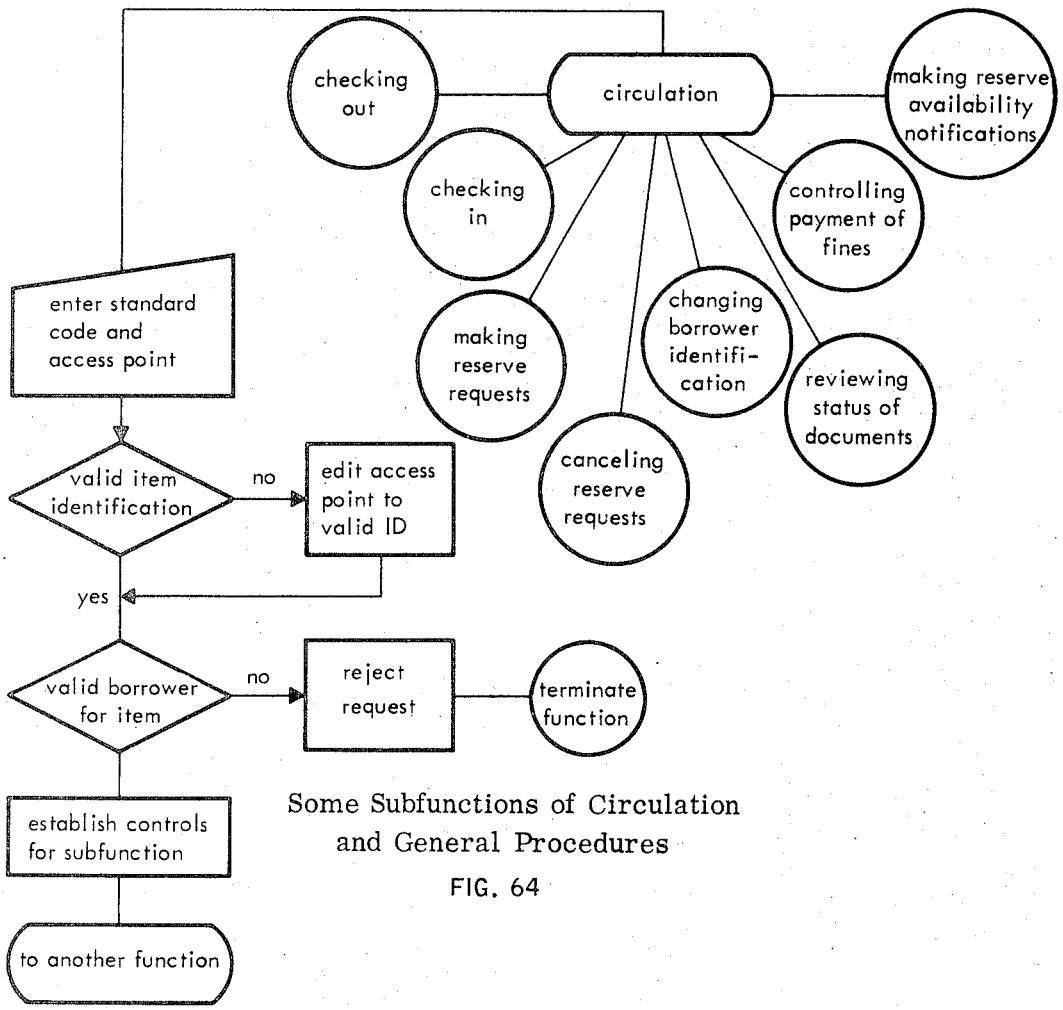
Figure 65:
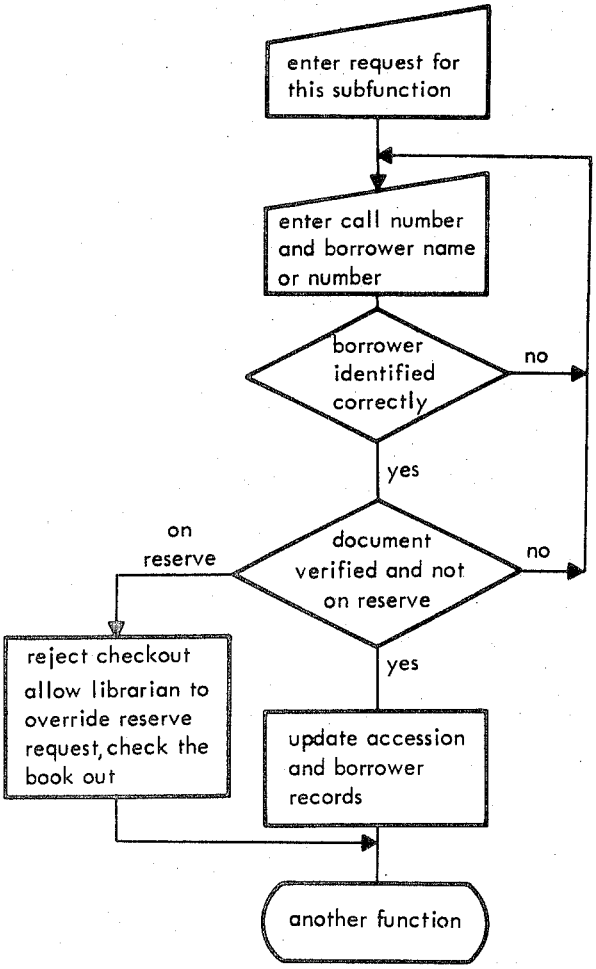
Figure 66:
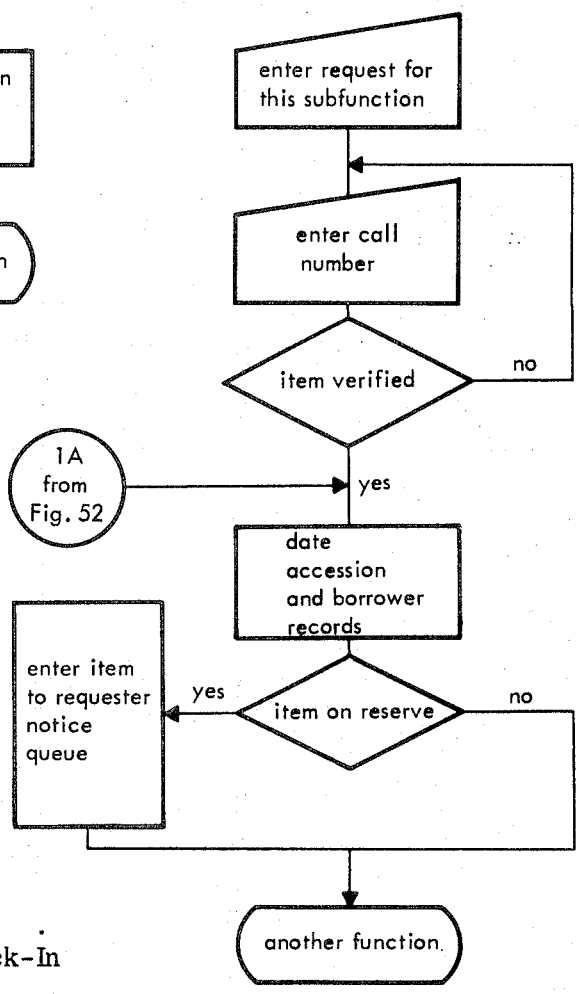
Figure 67:
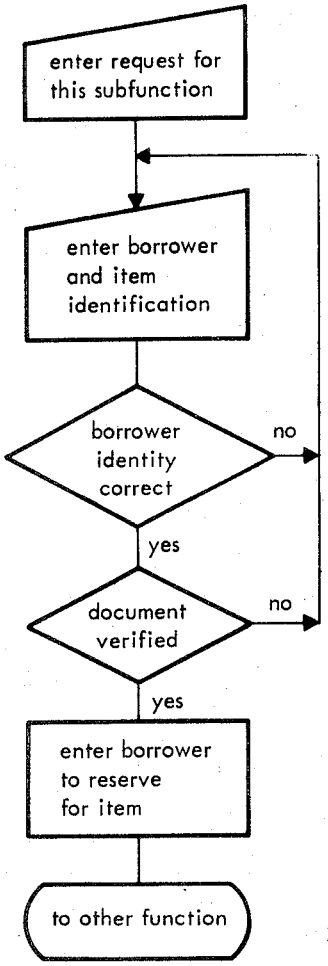
Figure 68:
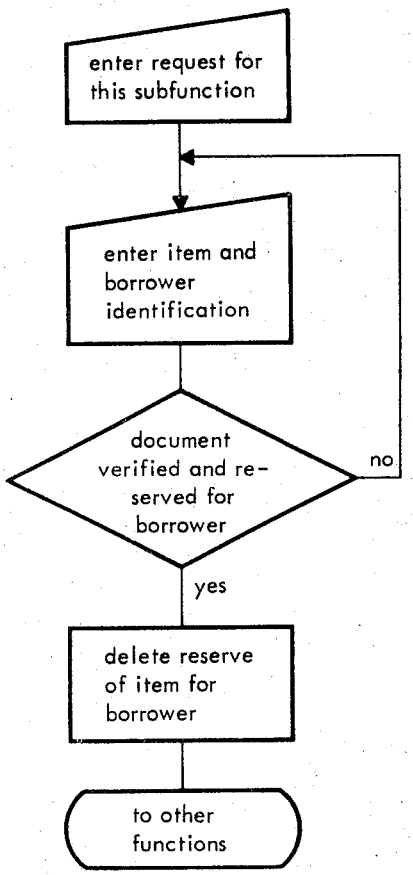
Figure 70:
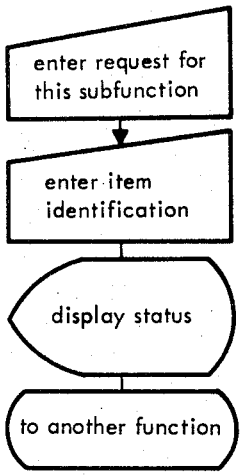
Figure 69:
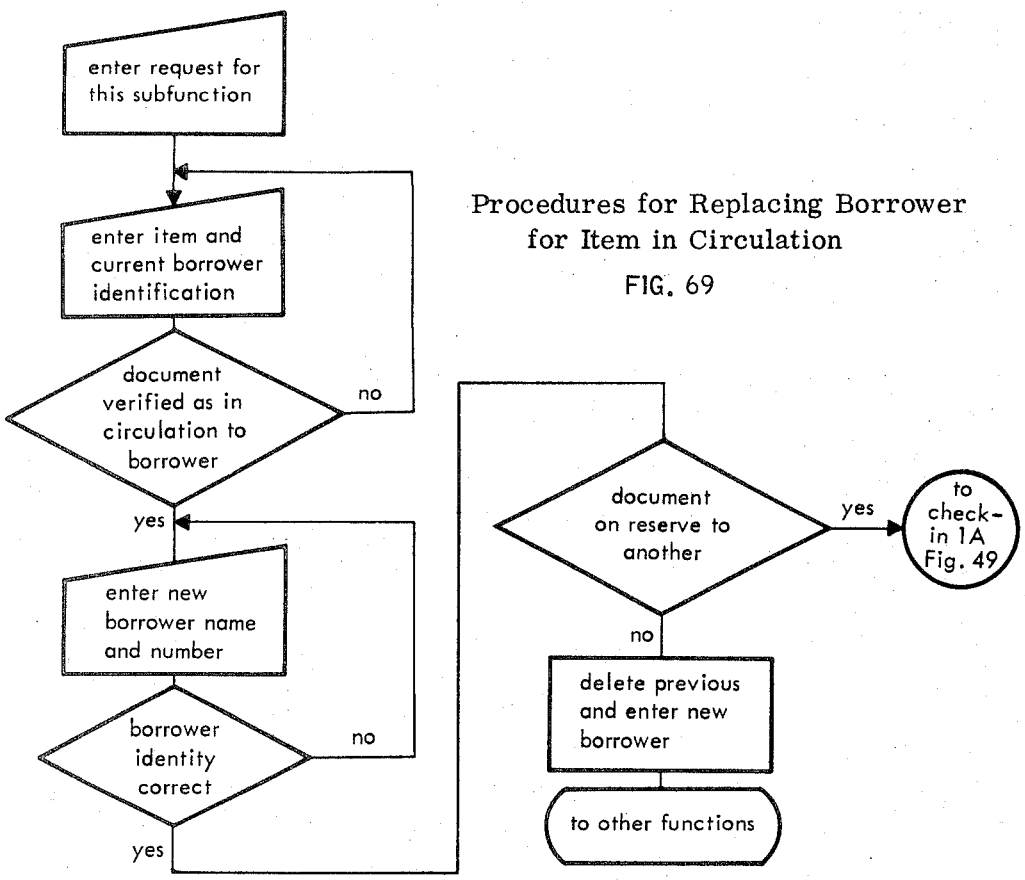
Figure 71:
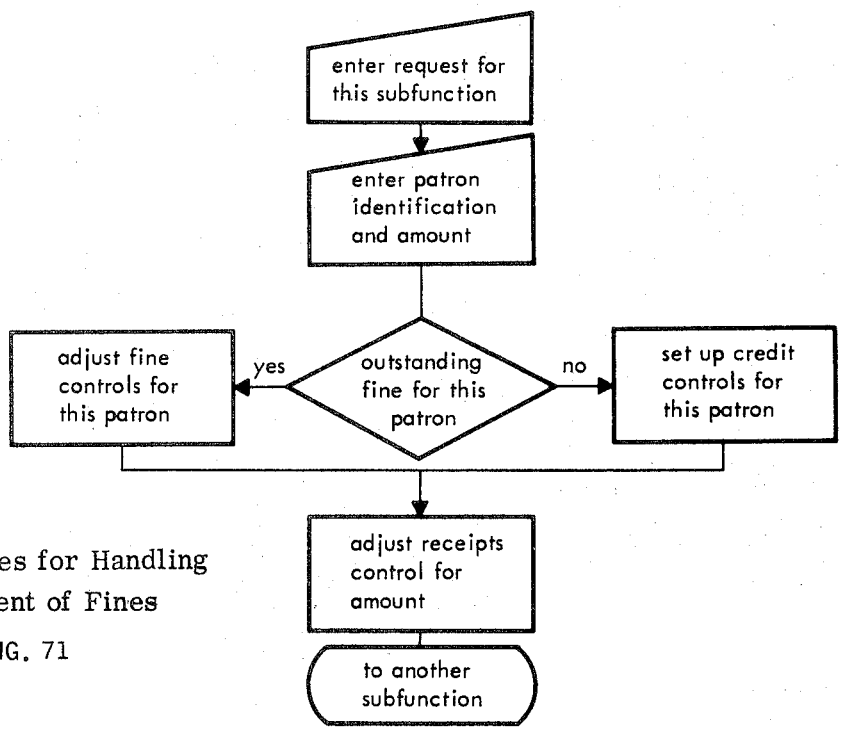
Figure 72:
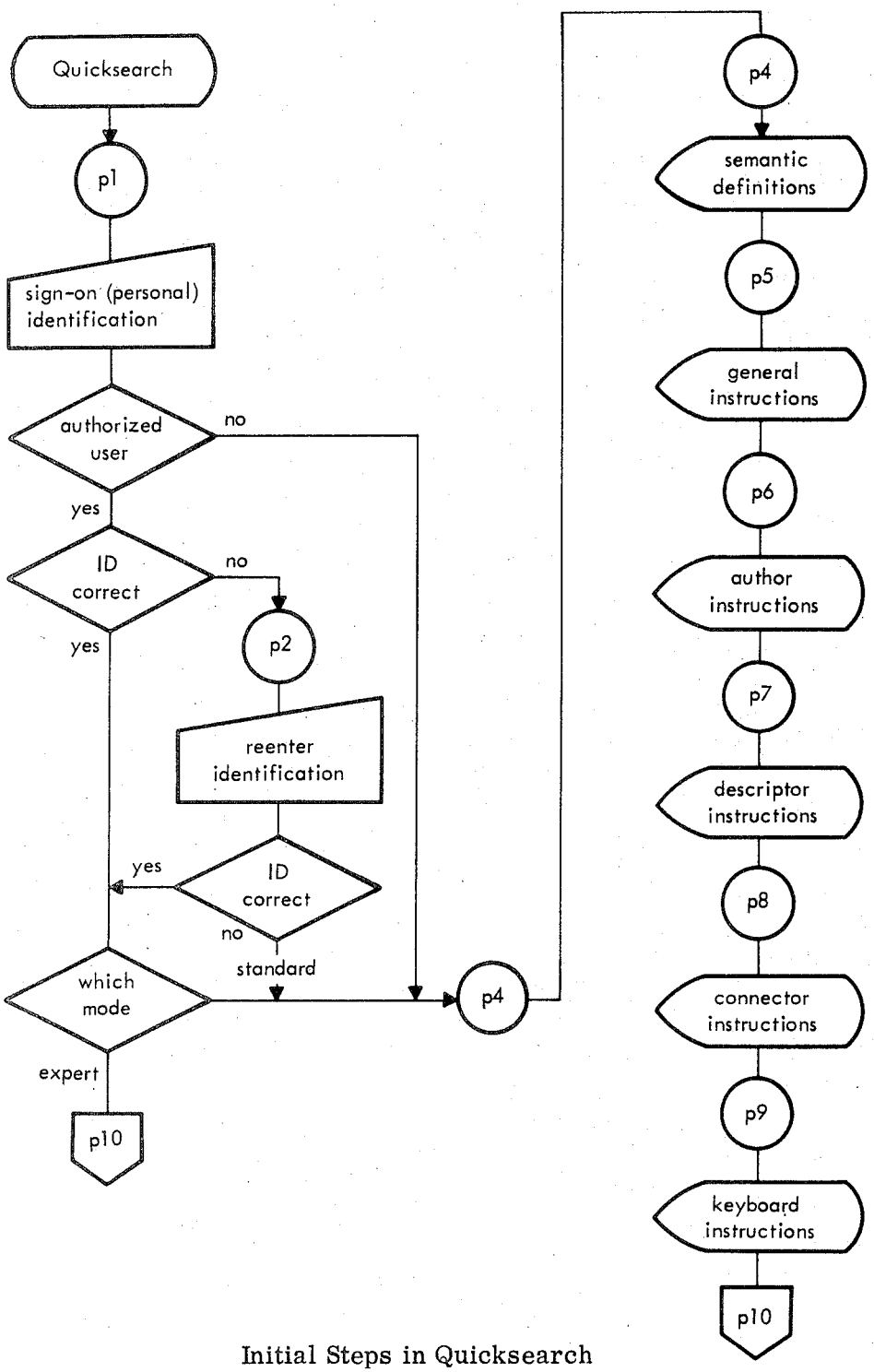
Figure 73:
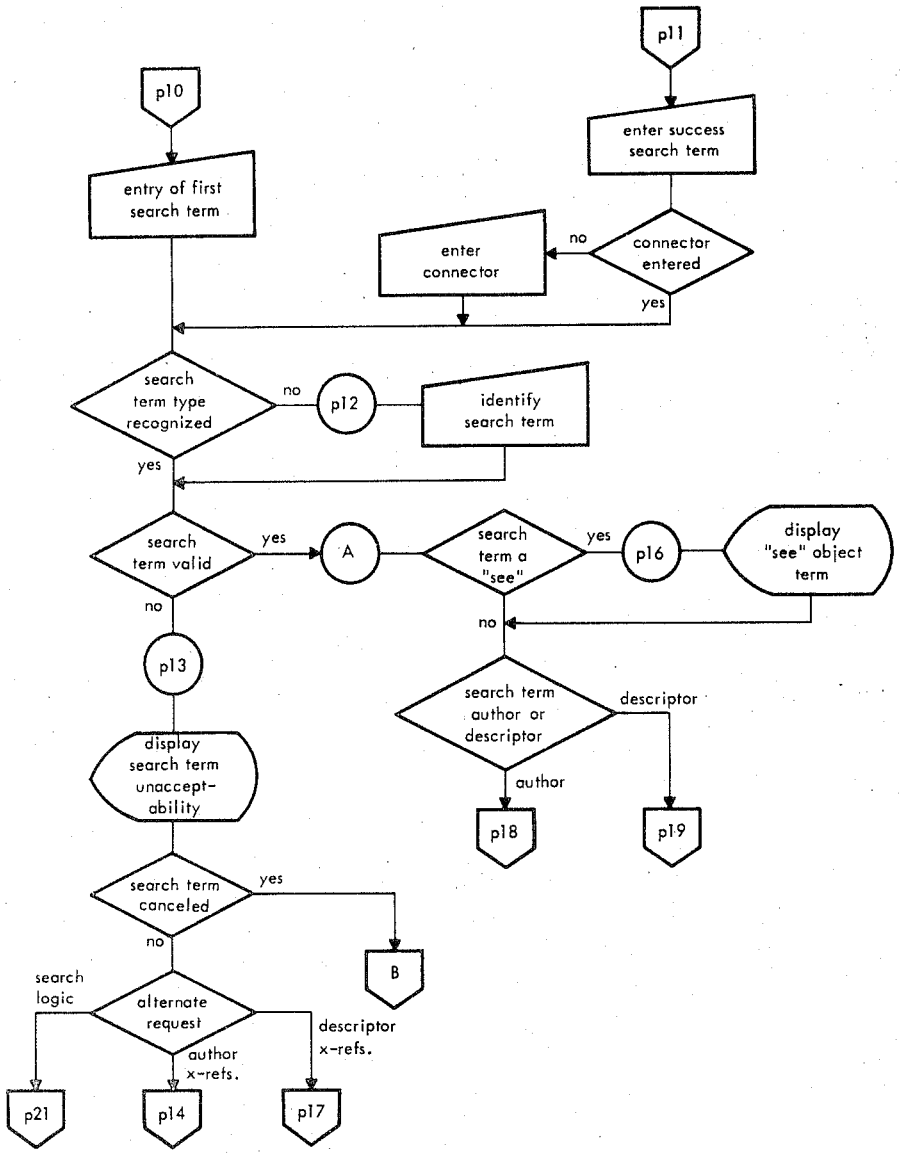
Figure 74:
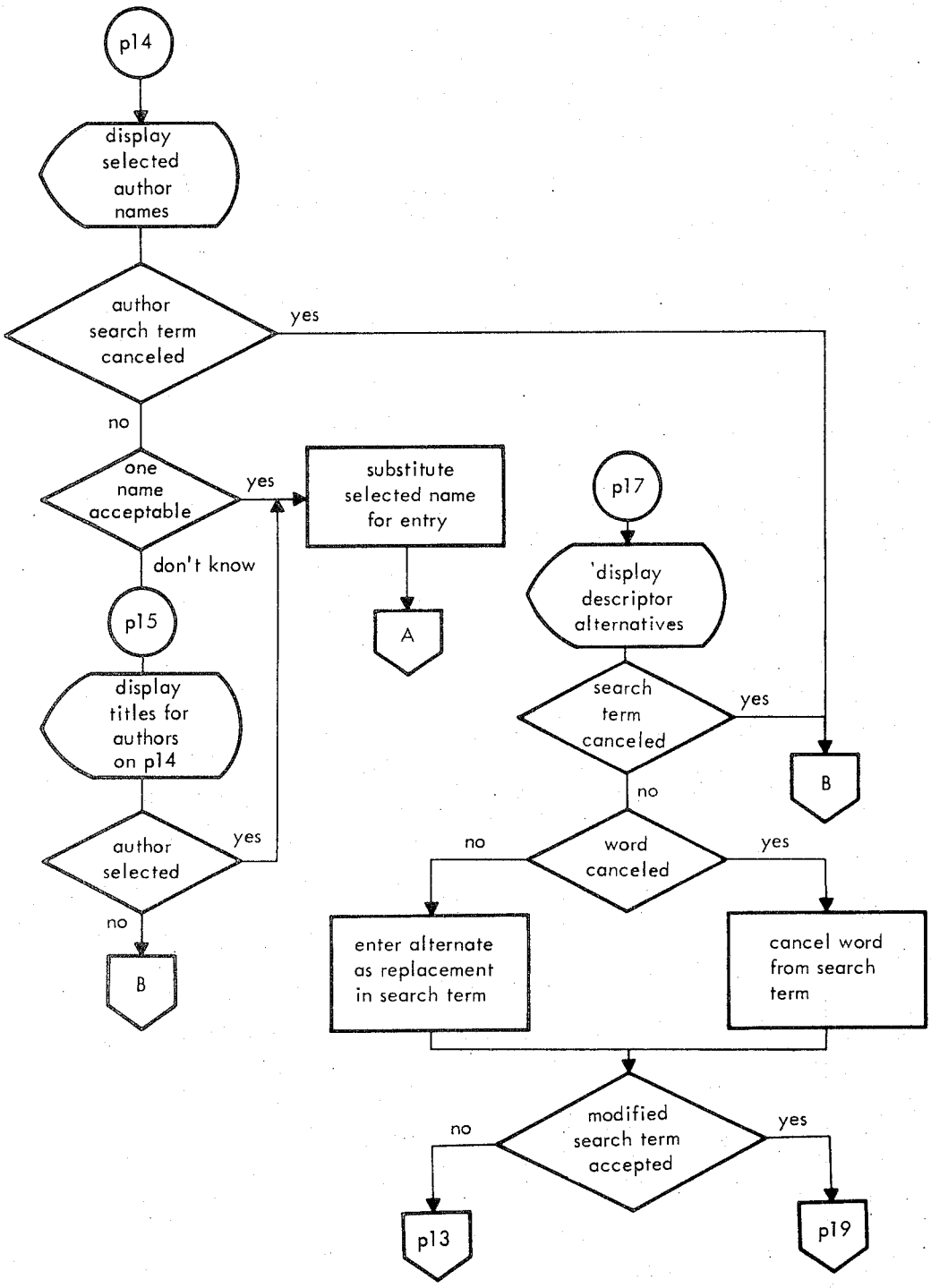
Figure 75:
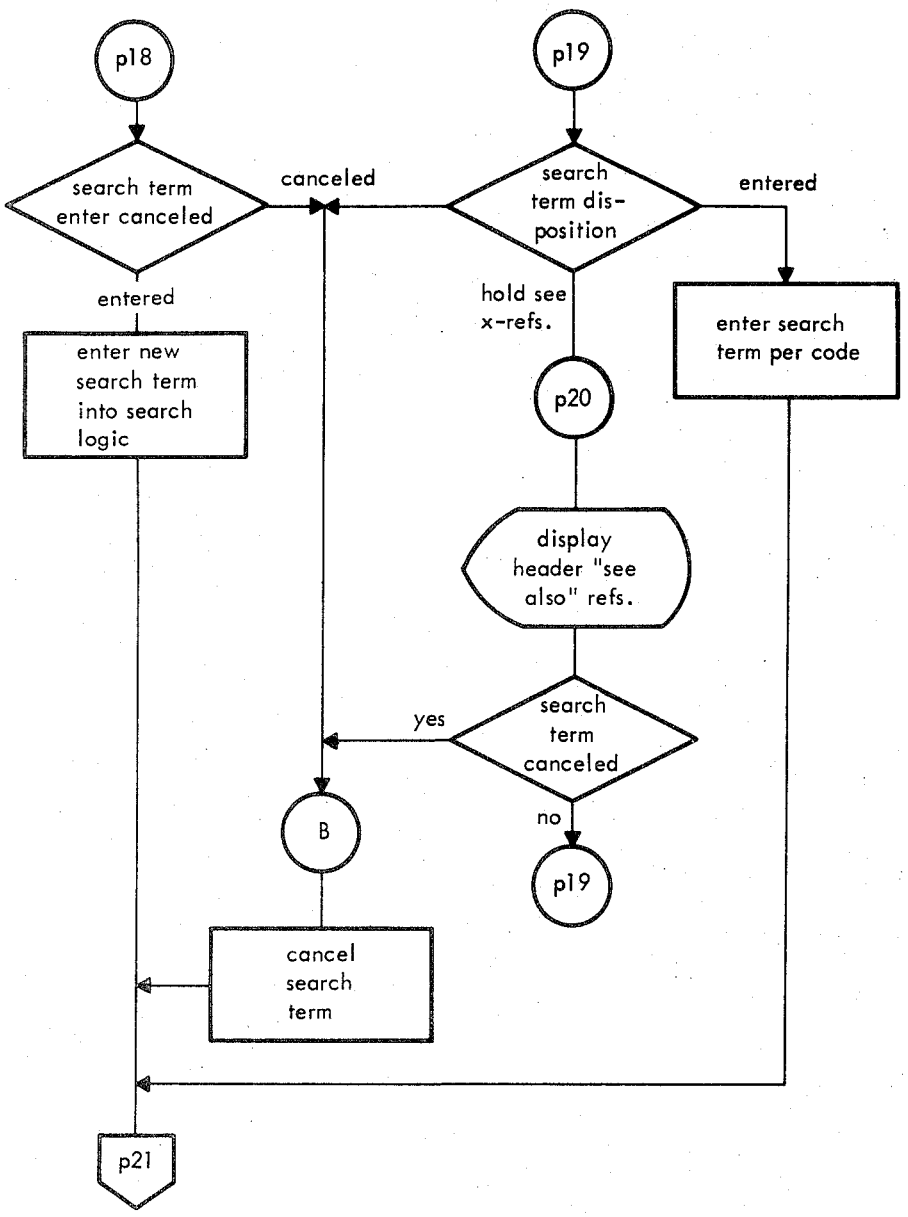
Figure 76:
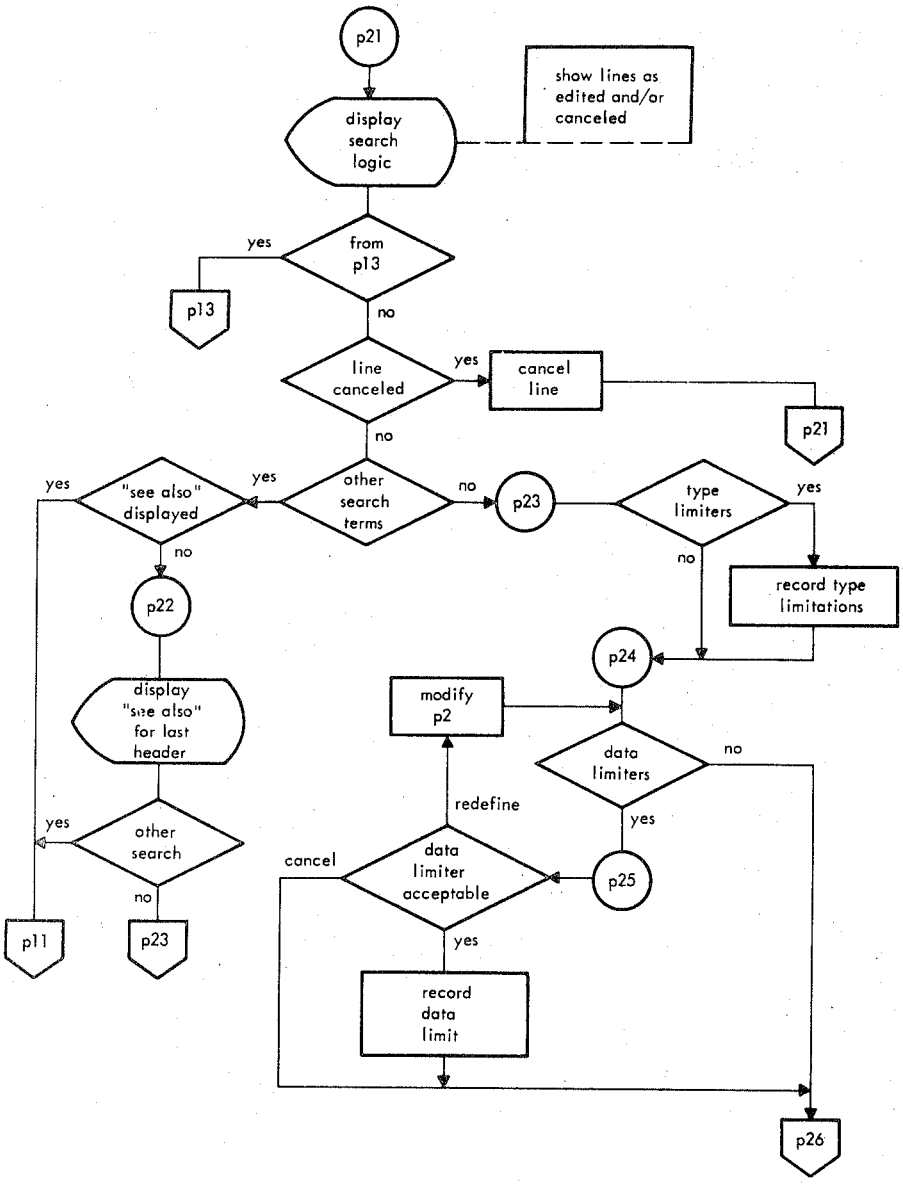
Figure 77:
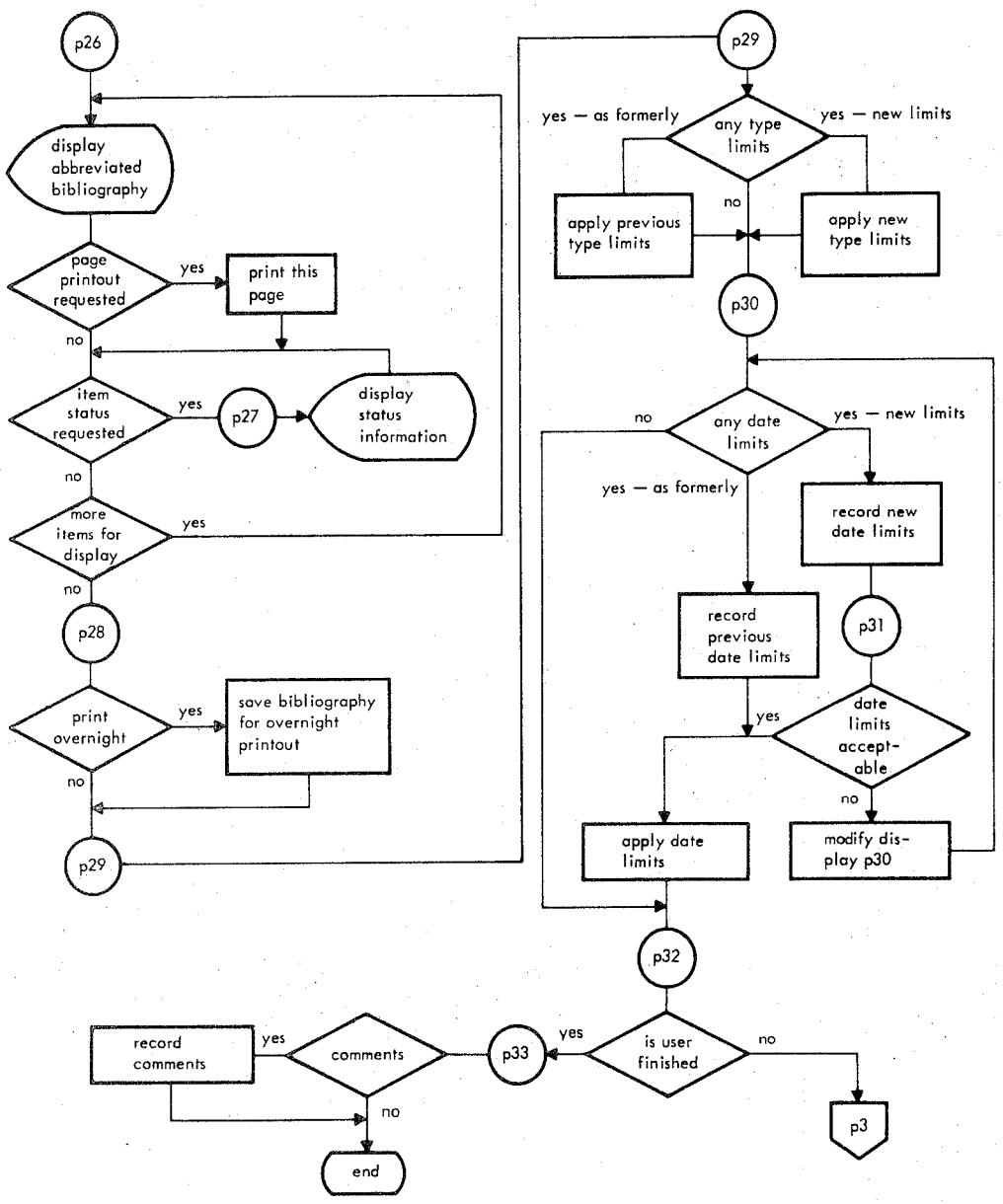
Figure 78A:
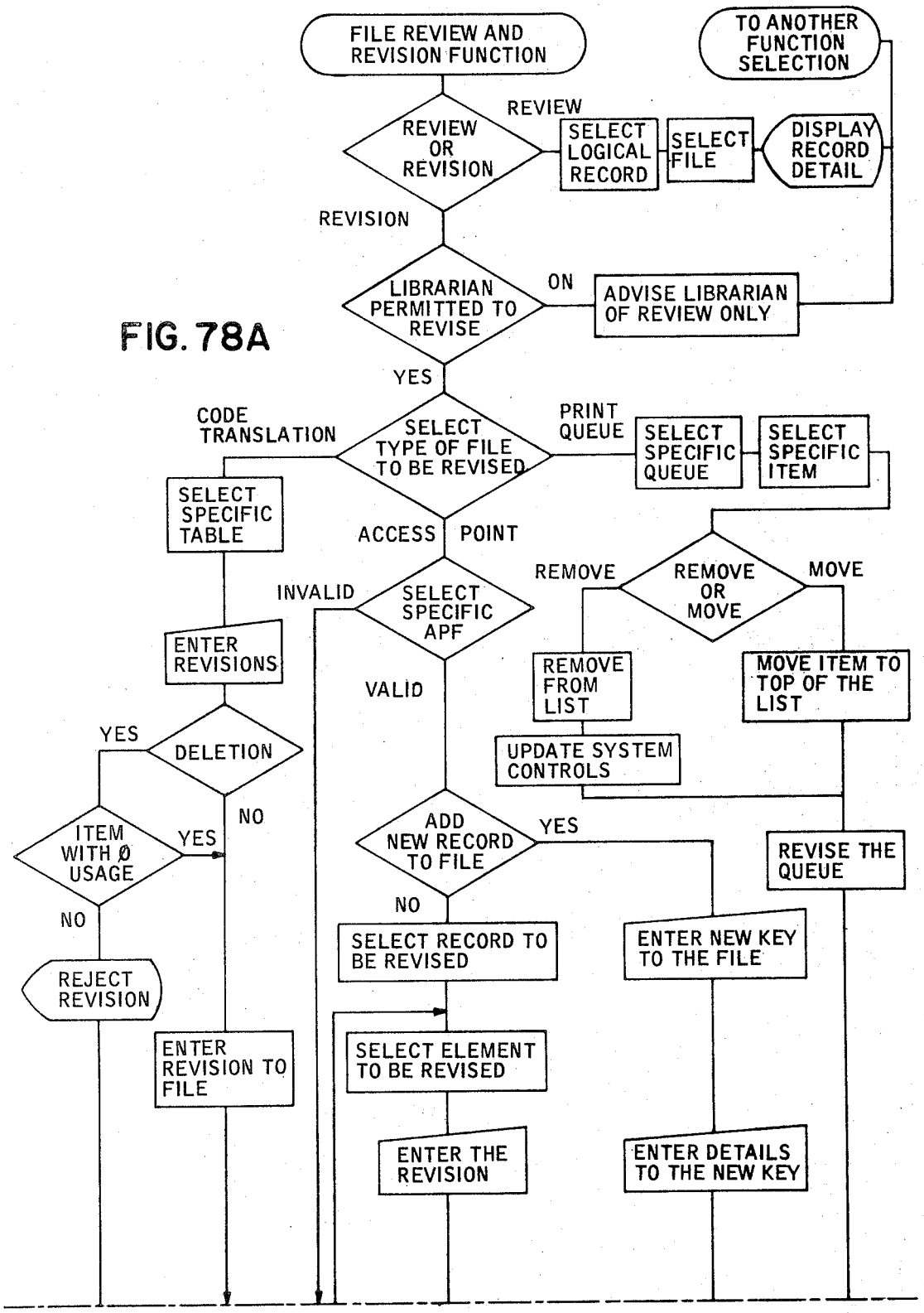
Figure 78B:
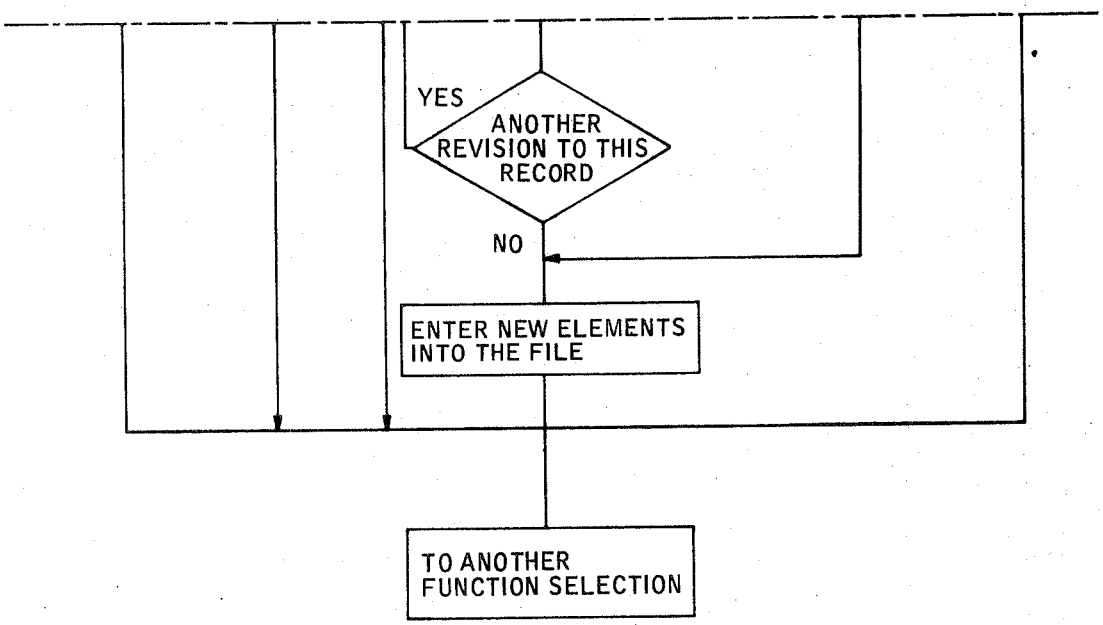
Figure 78:
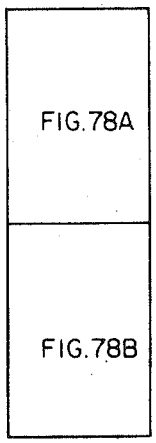
Figure 79:
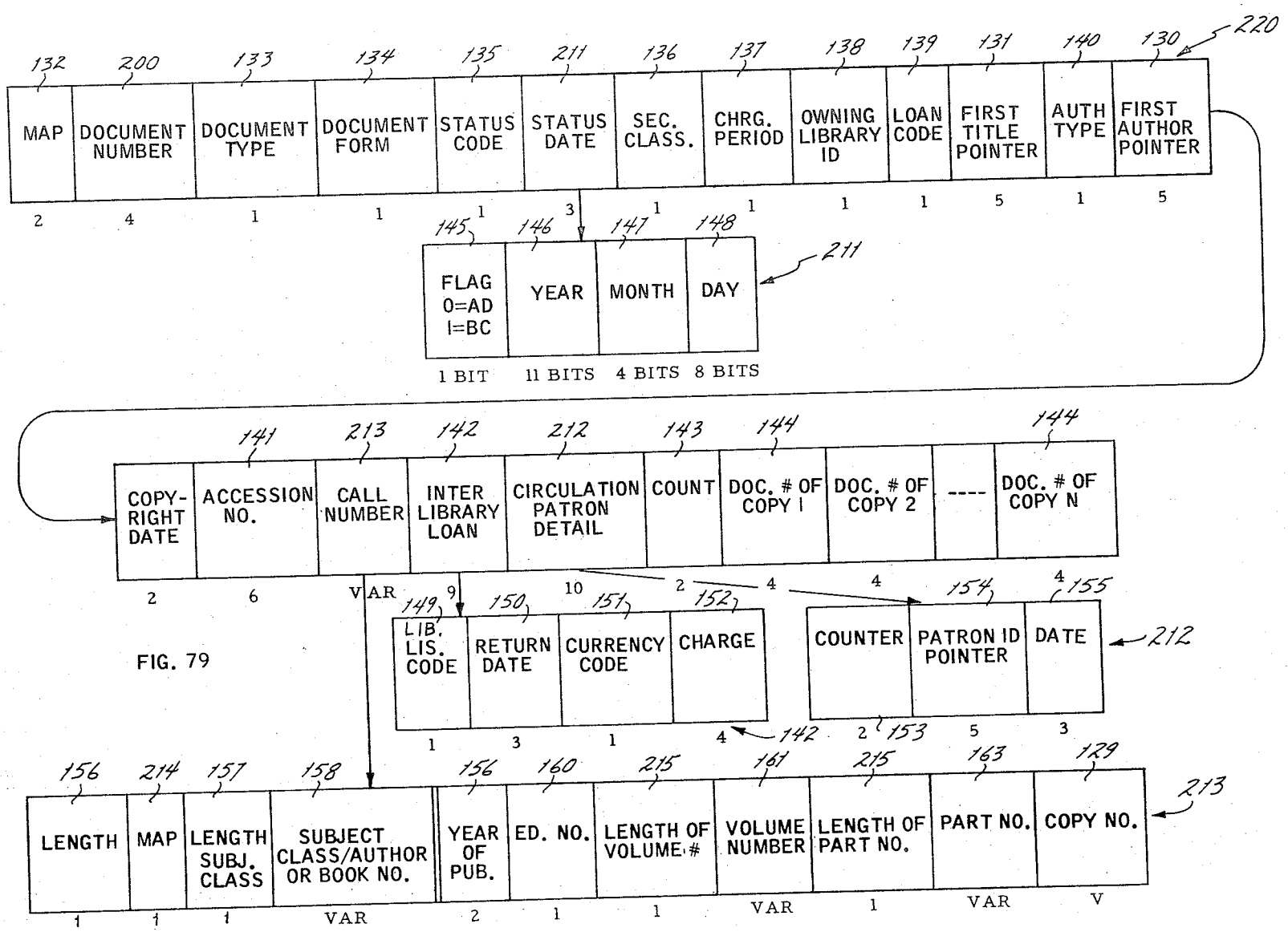
Figure 80:
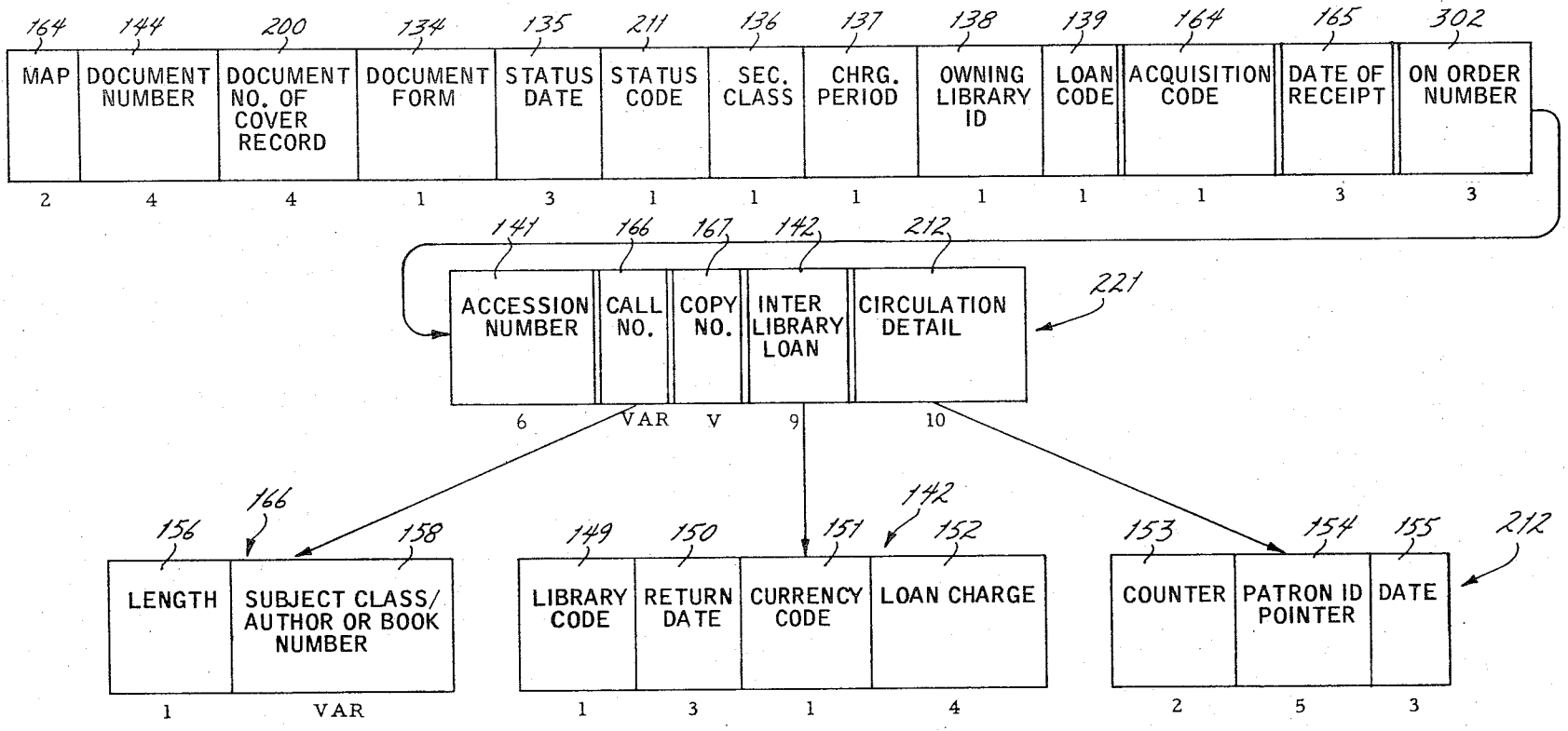
Figure 81:
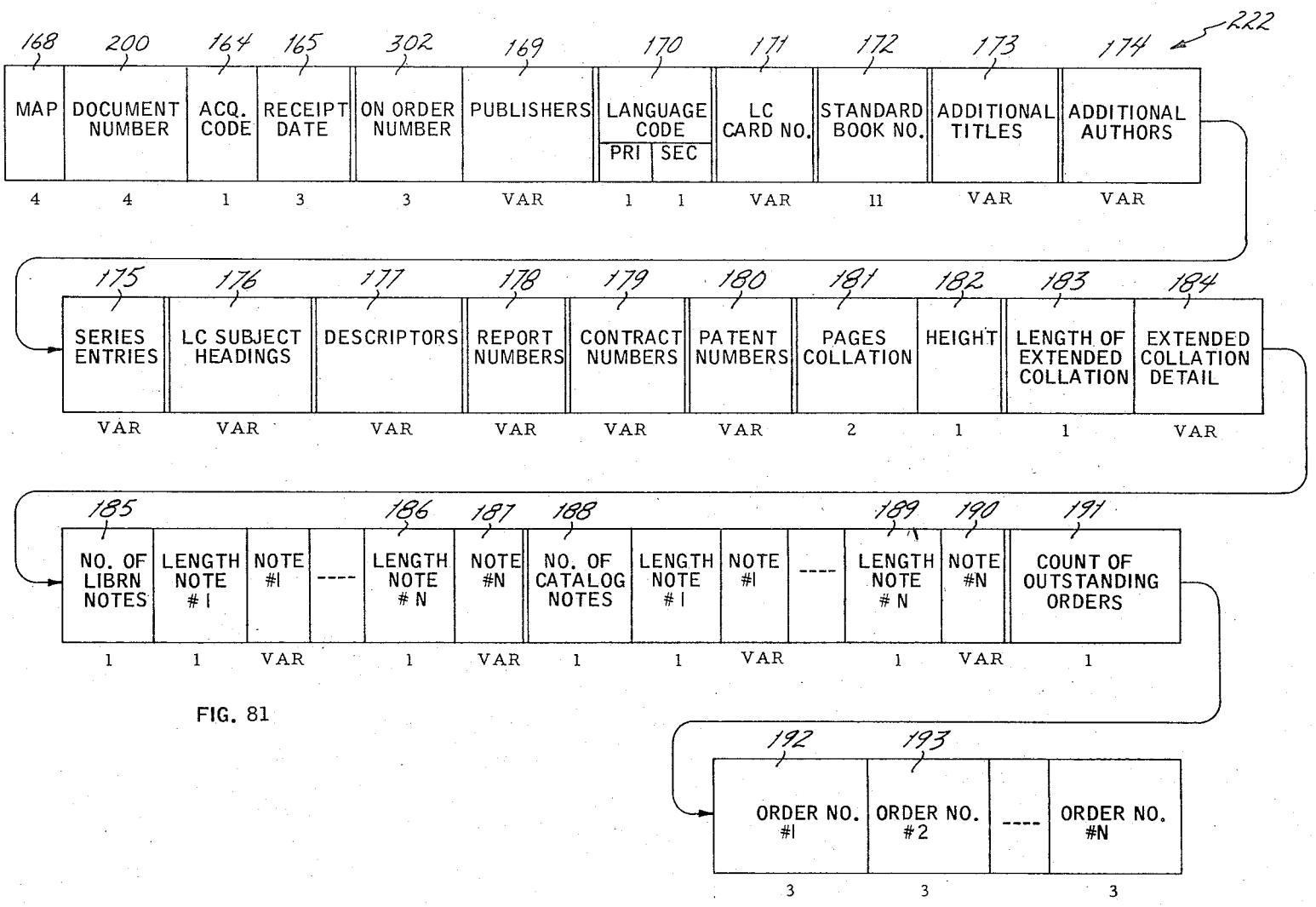
Figures 87, 90:
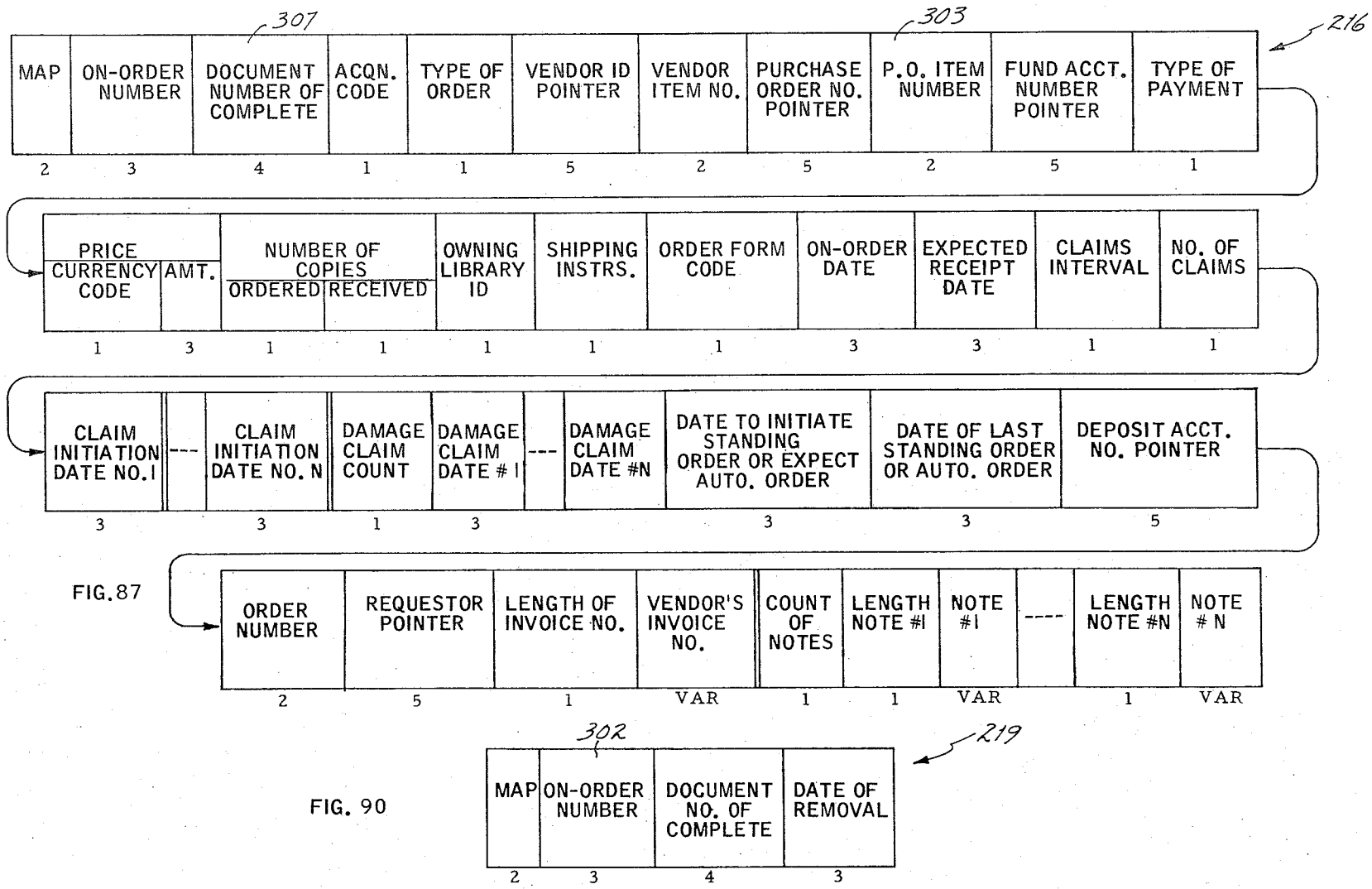
Figure 88:
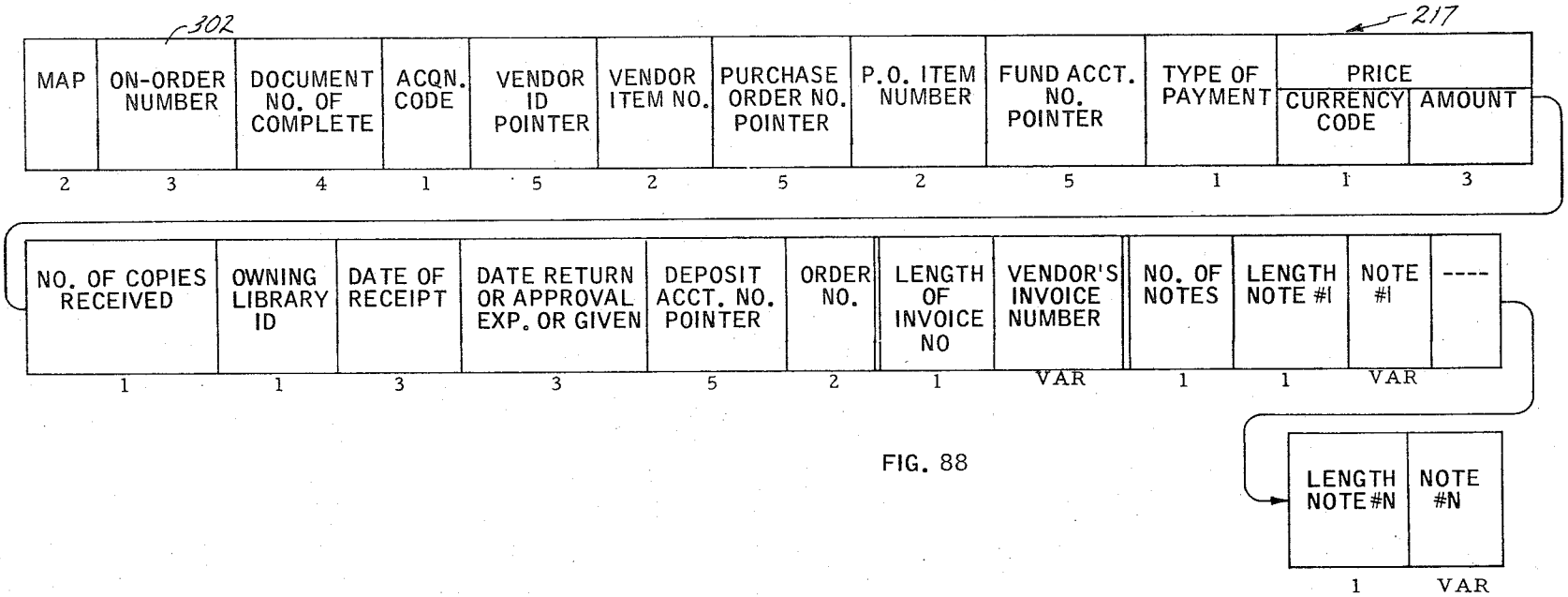
Figure 89:
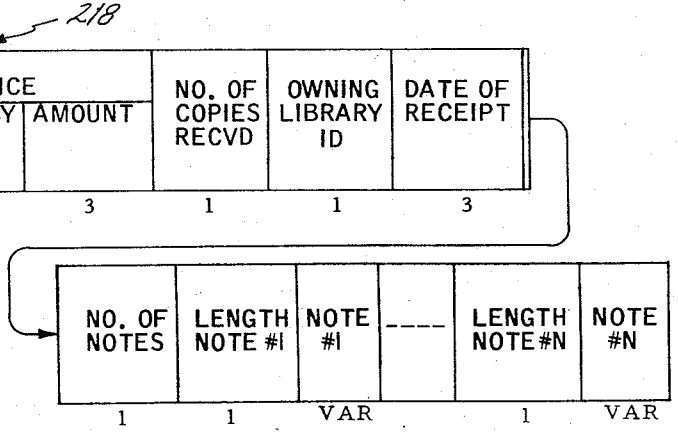
Figure 94:
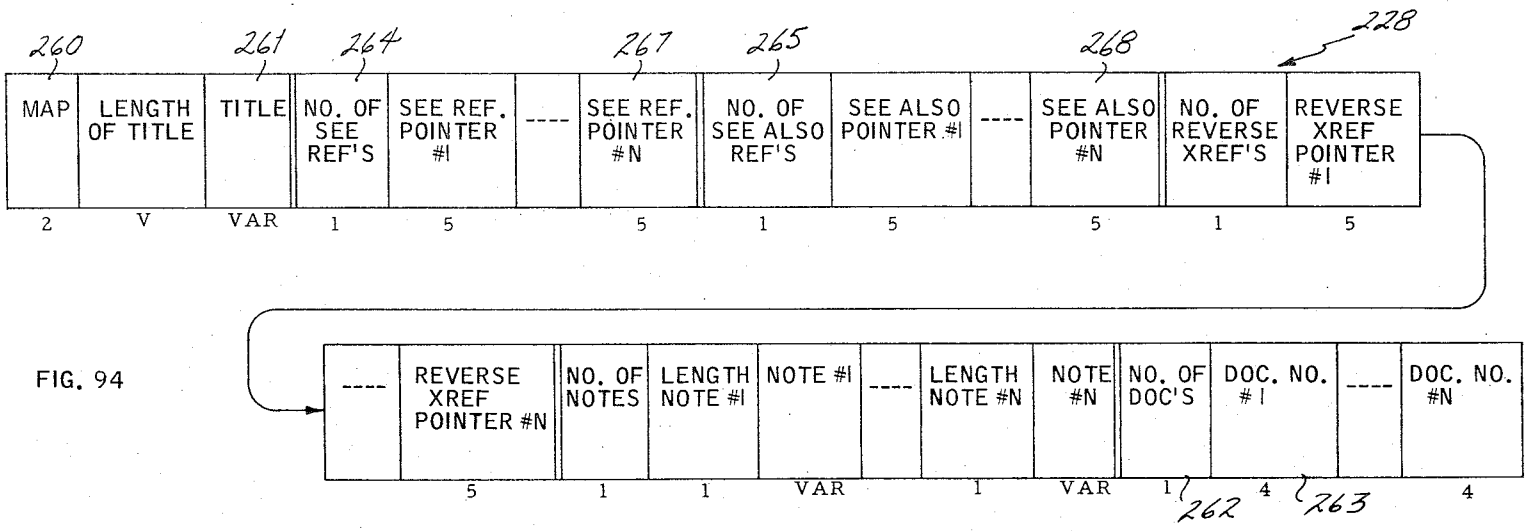
Figure 95:
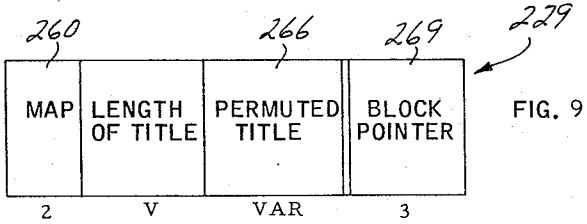
Figure 96:
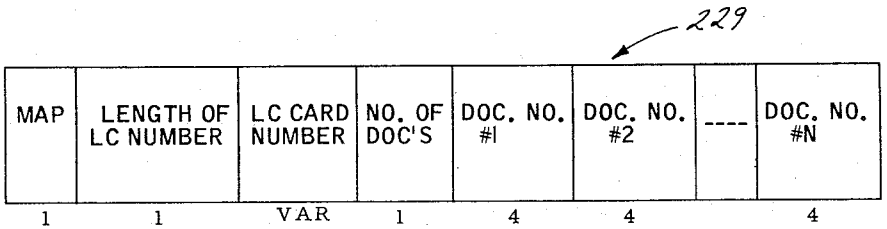
Figure 97:
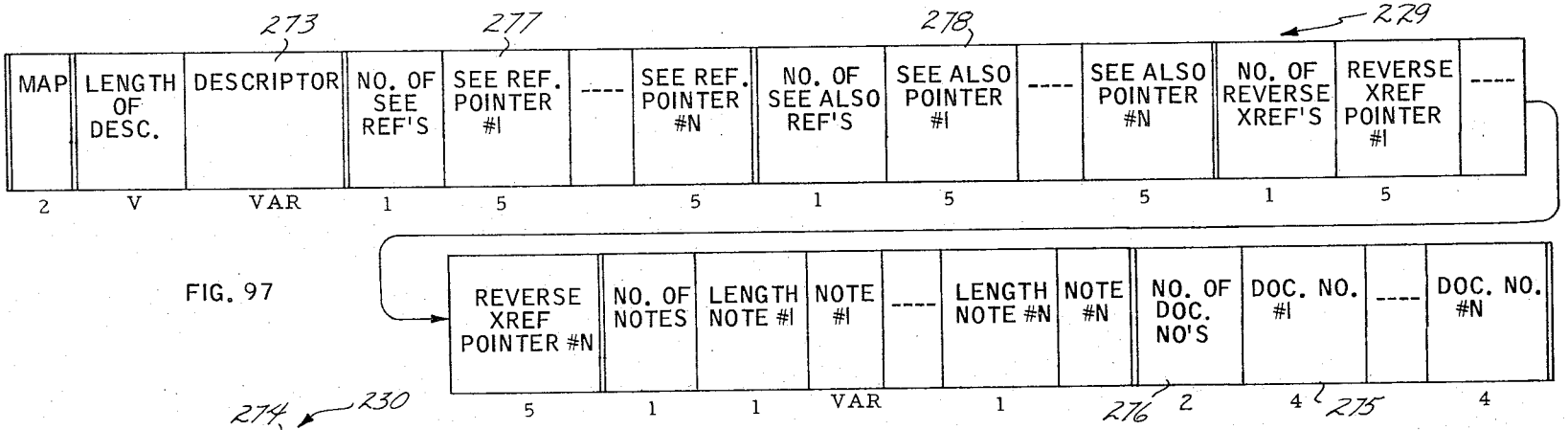
Figure 98:
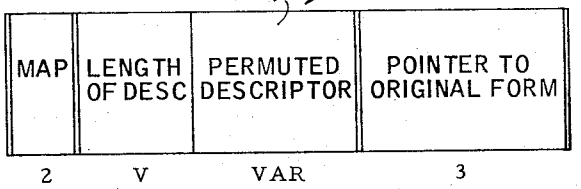
Figure 99:
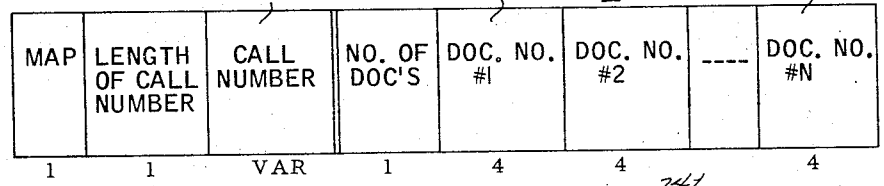
Figure 100:
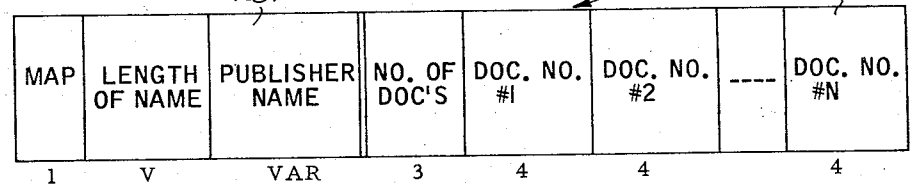
Figure 105:
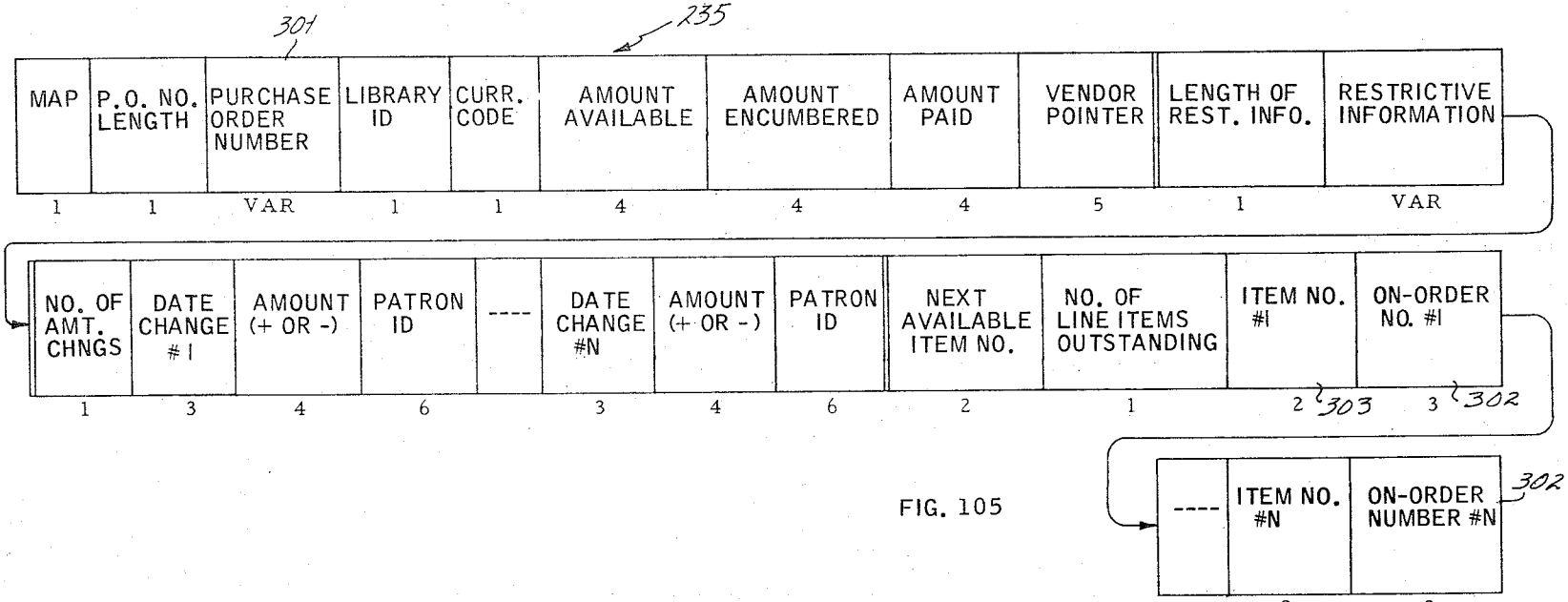
Figure 106:
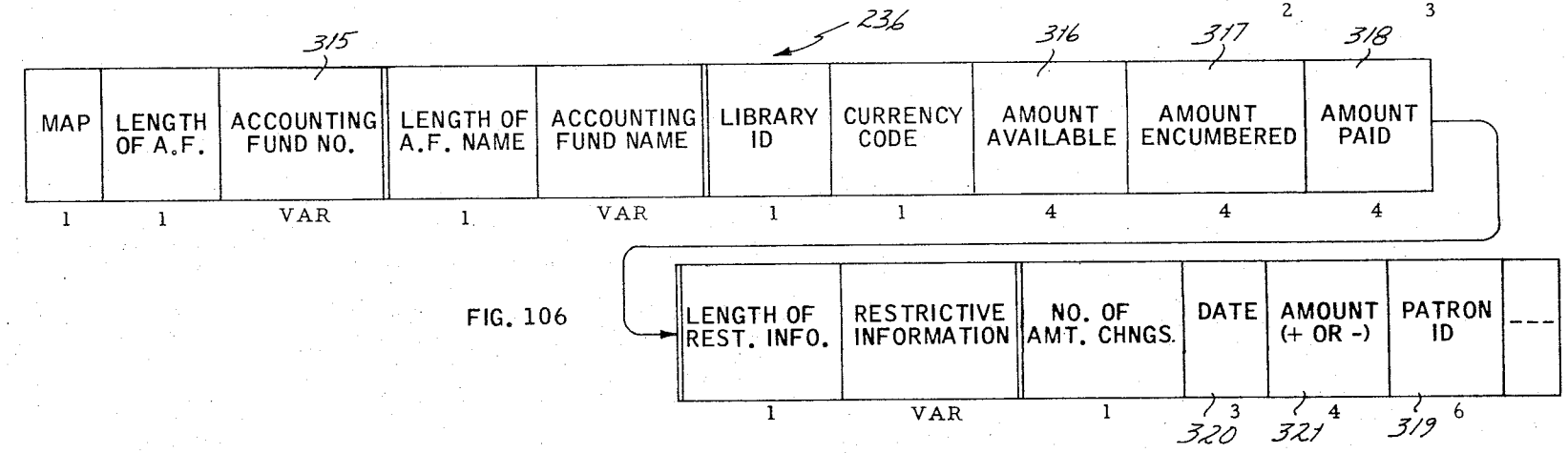
Figure 107:
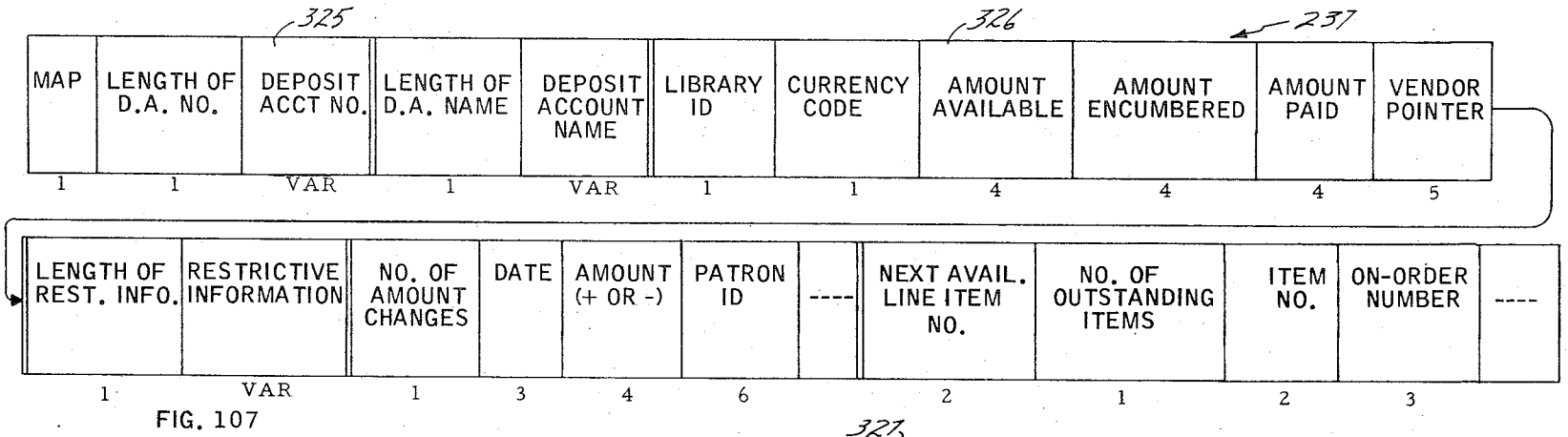
Figure 108:
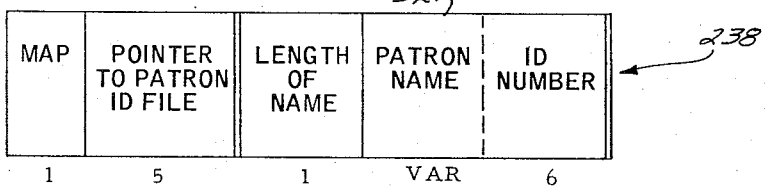
Figure 109:
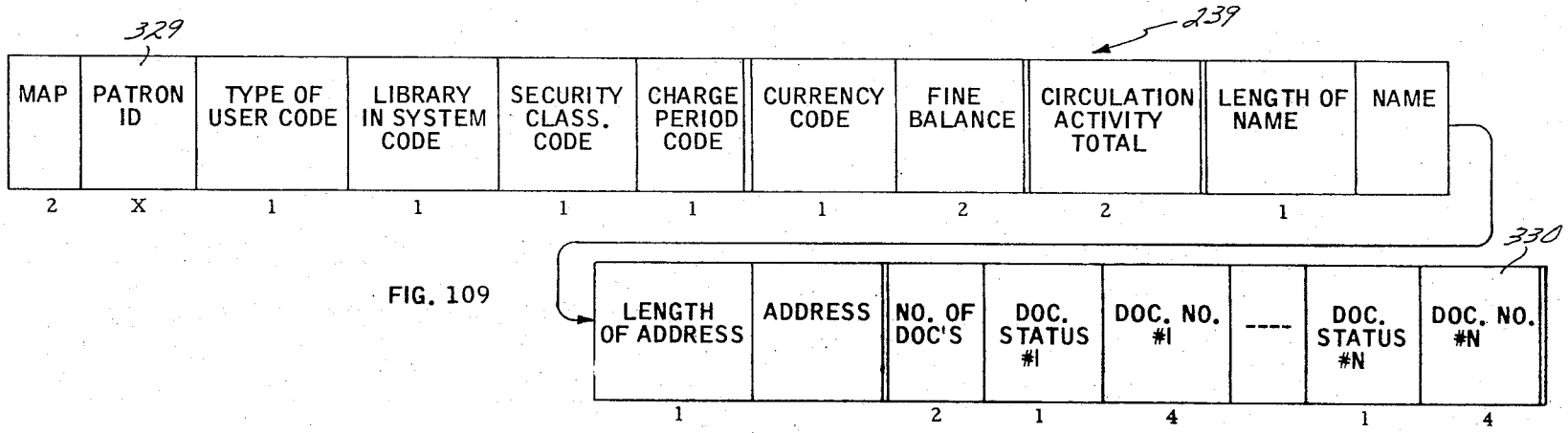
Figures 110, 111, 112, 113, 114:
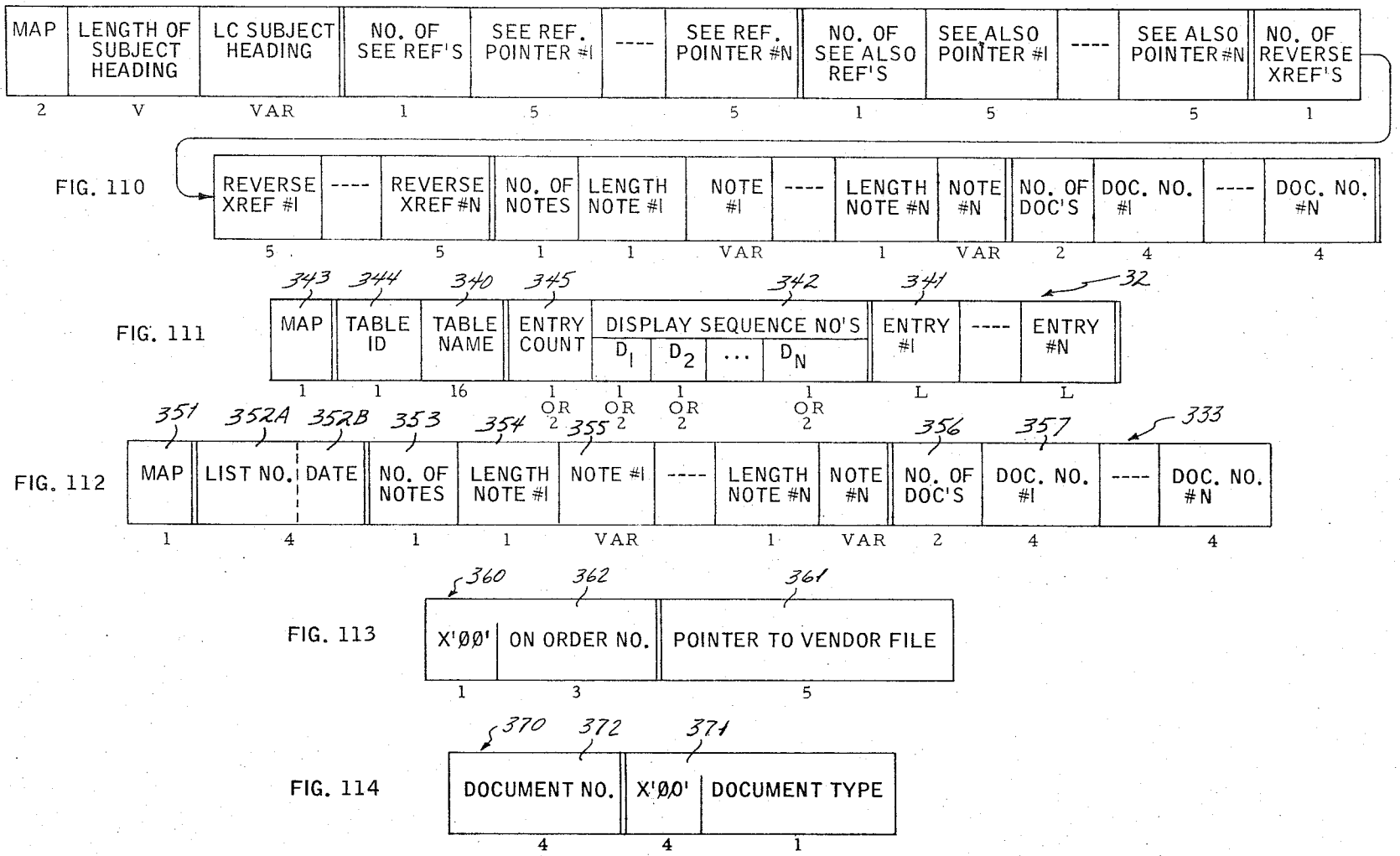

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 7, 1974

922 O.G. 9

T922,003

LIBRARY MANAGEMENT SYSTEM

Robert W. Alexander, Jr., Los Gatos, John M. Bell and John A. Christensen, San Jose, Roger W. Harvey, Santa Cruz, Katherine A. Hitchcock, Atherton, Robert W. Martin, San Jose, and Alice K. McMullen, Campbell, Calif., assignors to International Business Machines Corporation, Armonk, N.Y.

Continuation of application Ser. No. 327,252, Jan. 26, 1973, which is a continuation of application Ser. No. 150,853, June 7, 1971. This application Sept. 17, 1973, Ser. No. 398,140

**Int. Cl. G06f *9/12***

U.S. Cl. 444—1

51 Sheets Drawing. 284 Pages Specification

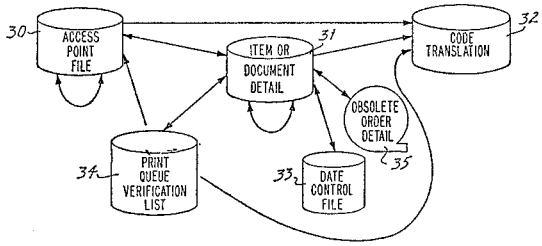

A file structure for an on-line system. A central processing system having core and direct access storage devices and input/output terminals is programmed for on-line applications such as inventory control, manufacturing process control, library management. The file structure for those applications includes an item detail file including a logical record for each individual item in the inventory, an access point file including inverted lists of item details having search or control significance, a code translation file having alphameric translations of coded data in the other files. Also included may be a print queue/verification file and date control file. Each file includes one or more index and data files. Forward and reverse indexing connects the files through use of implicit pointers and item numbers. On-line updating of record detail is simultaneously performable with review of that record. Events having future significance are triggered automatically. Logical and physical overflow records are accommodated, as are variable length logical records built on variable length counters. Last-in/last-out updating of logical record lists together with reverse order data fields and length/sequence fields optimizes "get" time. The application functions include ordering, receiving, cataloging, circulating, searching, and file maintaining.

LIBRARY MANAGEMENT SYSTEM
Original Filed June 7, 1971 51 Sheets-Sheet 1
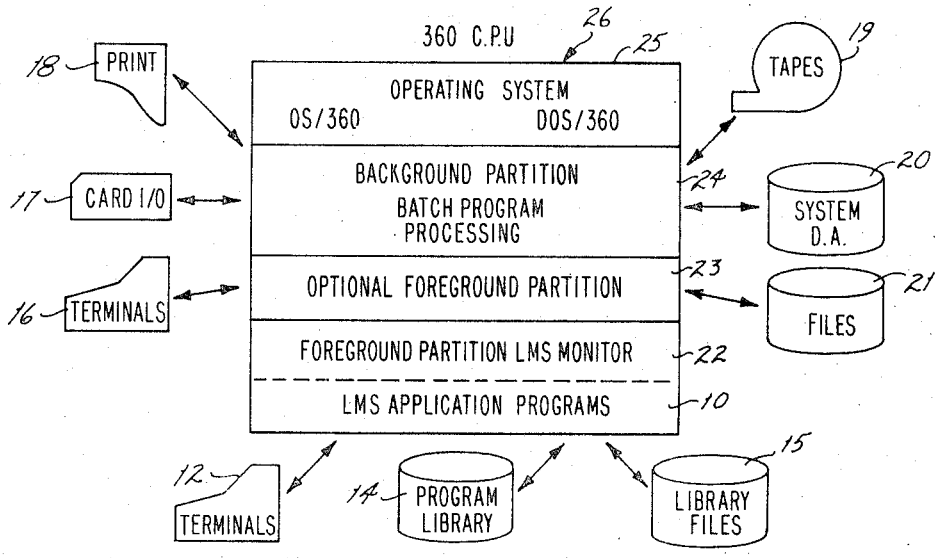
FIG. 1
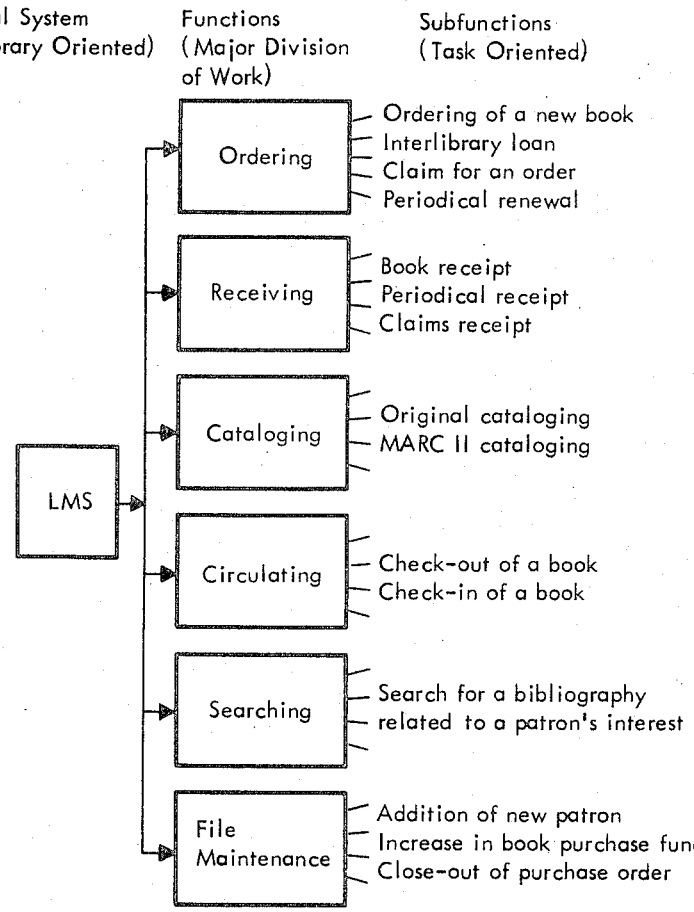
FIG. 2 LMS Functions and Subfunctions
INVENTORS.
ROBERT W. ALEXANDER, Jr.
JOHN M. BELL
JOHN A. CHRISTENSEN
ROGER W. HARVEY
KATHERINE A. HITCHCOCK
ROBERT W. MARTIN
ALICE K. McMULLEN
BY Shelley Beckstrand
ATTORNEY Some Subfunctions of Ordering

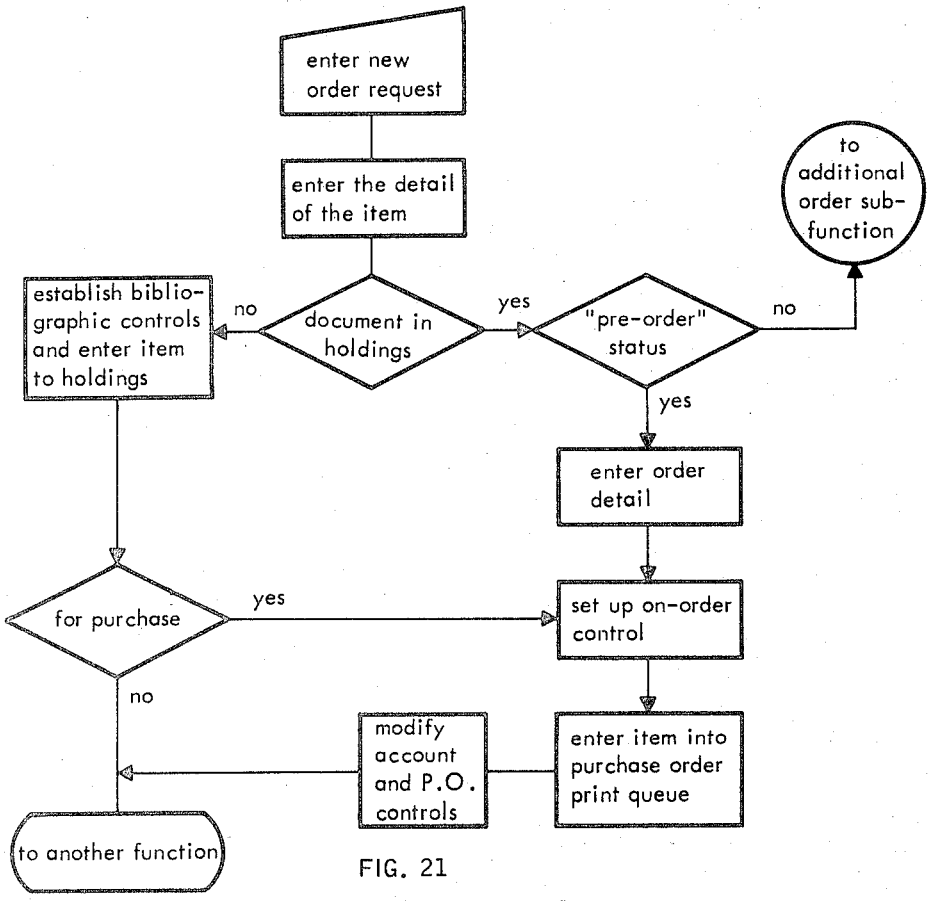
FIG. 21
Procedures for New Orders
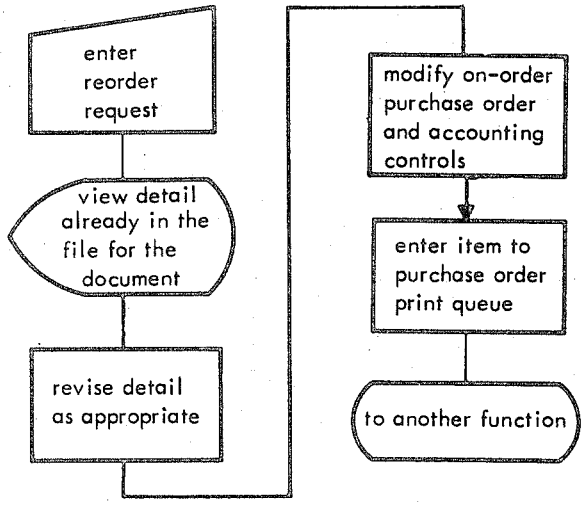
FIG. 22 Procedures for Reorders Procedures for Additional Orders Procedures for Ordering Special Issues of Periodicals Procedures for Ordering Periodical Indexes Procedures for claims
a. For Nonperiodicals Procedures for Claims
b. For Missing Periodical Issues Procedures for Claims for Periodical Indexes Procedures for Canceling Outstanding Orders Procedures for Automatic Ordering

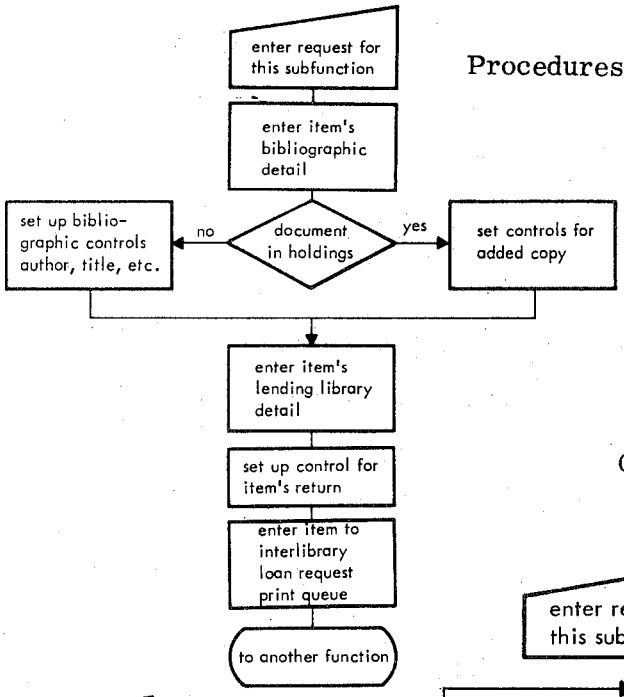
Procedures for Interlibrary Loan
FIG. 31
Cancellation of Subscriptions Before Termination
FIG. 33
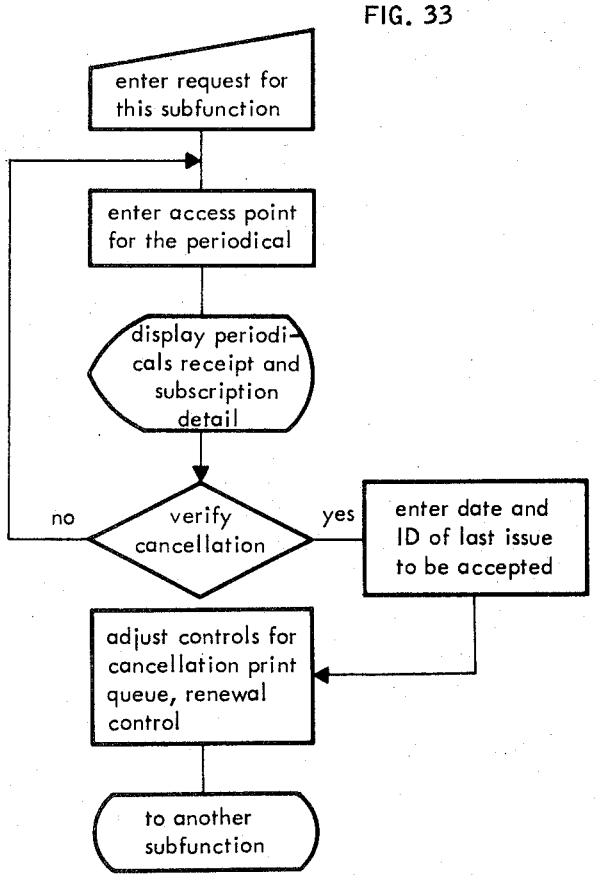
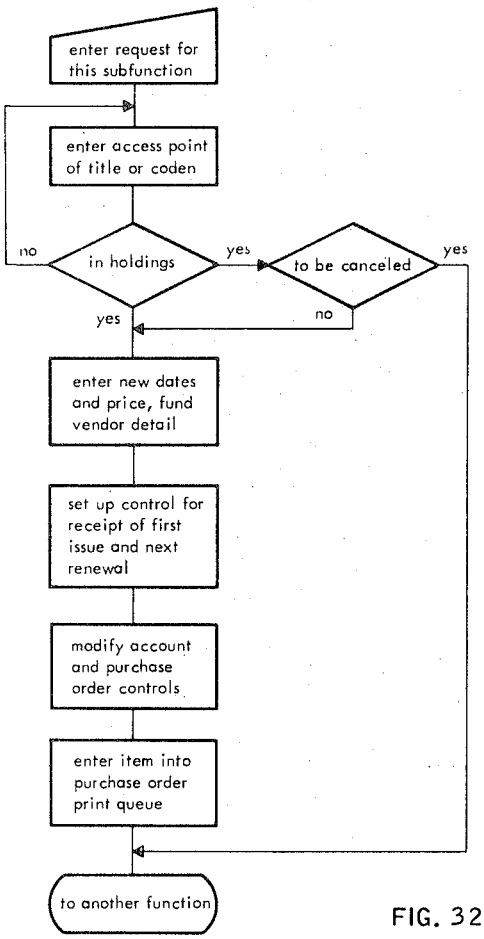
FIG. 32 Procedures for Periodical Renewals Procedures for Canceling Claims Procedures for New Item Entries Without Ordering Procedures for Standing Orders Procedures for Blanket Purchase Orders Procedures for Bindery Orders Procedures for Orders from Machine-Readable Input Procedures for Replacement Orders Procedures for Requesting Price Quotations Procedures for Cancellation of Subscription Renewals Some Subfunctions of Receiving Procedures for Reviewing Periodical Renewals Procedures for Receipt of Undamaged Periodicals Procedures for Receipt of Damaged Nonperiodicals Procedures for Receipt of Interlibrary Loans Procedures for Receipt of Bindery Orders Procedures for Receipt of Unordered Periodicals Procedures for Receipt of Blanket Purchase Order Items Procedures for Receipt of Ordered Periodicals Procedures for Receipt of Replacement Orders Procedures for Cancellation of Price Quote Requests Some Subfunctions of Cataloging and General Procedures Procedures for Initial Cataloging of New Items Procedures for Revising Detail of an Accession Procedures for Transferring Document Detail Procedures for Purging an Accession Procedures for Requesting a Proof Sheet Procedures for Changing a Periodical Title Procedures for Replacing a Subscription Procedures for Replacing a Subscription (Continued)

Procedures for Cataloging from Machine-Readable Input

Some Subfunctions of Circulation and General Procedures

Procedures for Check-Out

Procedures for Check-In

Procedures for Placing Reserves

Procedures for Canceling Reserves

Procedures for Reviewing Document Status

Procedures for Replacing Borrower for Item in Circulation

Procedures for Handling Payment of Fines

Initial Steps in Quicksearch

Procedure from Entry of First Search Term to Author/Descriptor Distinction

Processing of Author and Descriptor Search Terms

Cancellation of Search Term

Procedures for "See Also" and for Limitations in Type of Document to be searched Batchsearch (Left) and Date Limitation Details (Right)

(LMS) LIBRARY MANAGEMENT SYSTEM

169

| COUNT | PUBLISHER #I PNTR | PUBLISHER LOC'N CODE | PUBLISHER DATE | ---- | PUBLISHER #N POINTER | PUBLISHER LOC'N CODE | PUBLISHER DATE |
|---|---|---|---|---|---|---|---|
| 1 | 5 | 2 | 2 | | 5 | 2 | 2 |

FIG. 82

178, 179

| COUNT | SOURCE (PUBLISHER) POINTER #I | REPORT - OR - CONTRACT NO. POINTER #I | ---- | SOURCE (PUBLISHER) POINTER #N | REPORT - OR - CONTRACT NO. POINTER #N |
|---|---|---|---|---|---|
| 1 | 5 | 5 | | 5 | 5 |

FIG. 83

180

| COUNT | COUNTRY CODE | PATENT NO. POINTER #I | ---- | COUNTRY CODE | PATENT NO. POINTER #N |
|---|---|---|---|---|---|
| 1 | 1 | 5 | | 1 | 5 |

FIG. 84

174

| COUNT | AUTH. TYPE CODE | AUTHOR POINTER #I | ---- | AUTH. TYPE CODE | AUTHOR POINTER #N |
|---|---|---|---|---|---|
| 1 | 1 | 5 | | 1 | 5 |

FIG. 85

177, 173, 175, 176

| COUNT | POINTER #I | ---- | POINTER #N |
|---|---|---|---|
| 1 | 5 | | 5 |

FIG. 86

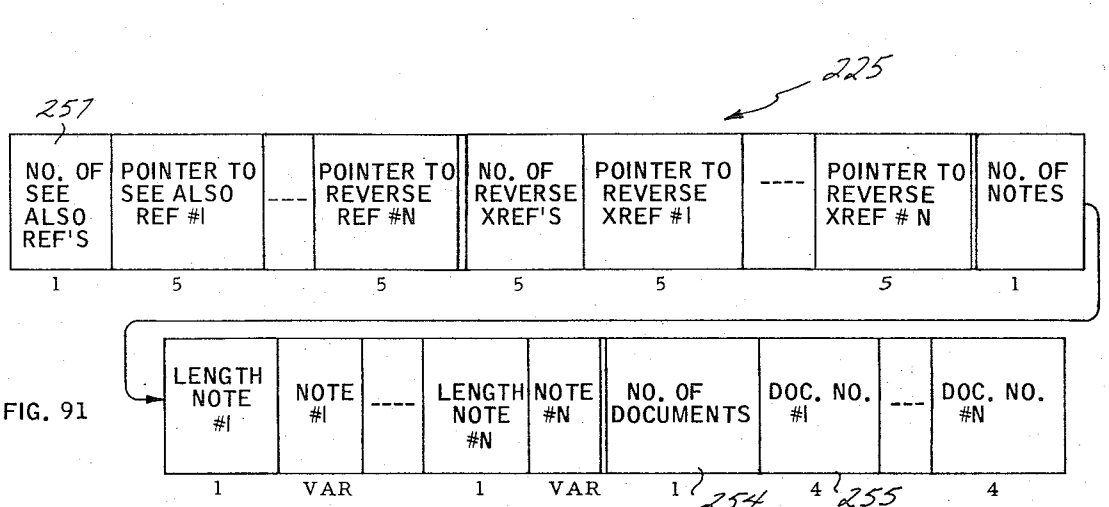
FIG. 91
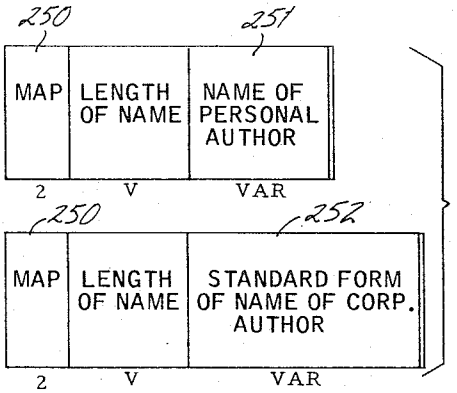
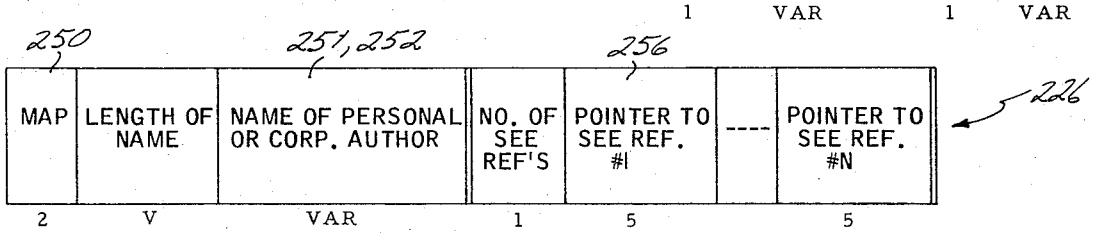
FIG. 92
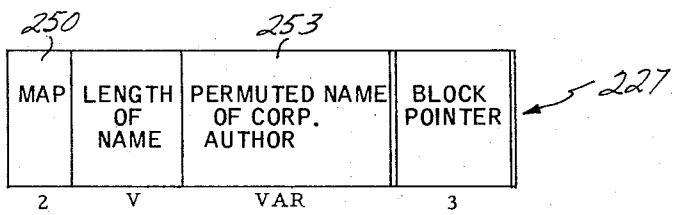
FIG. 93

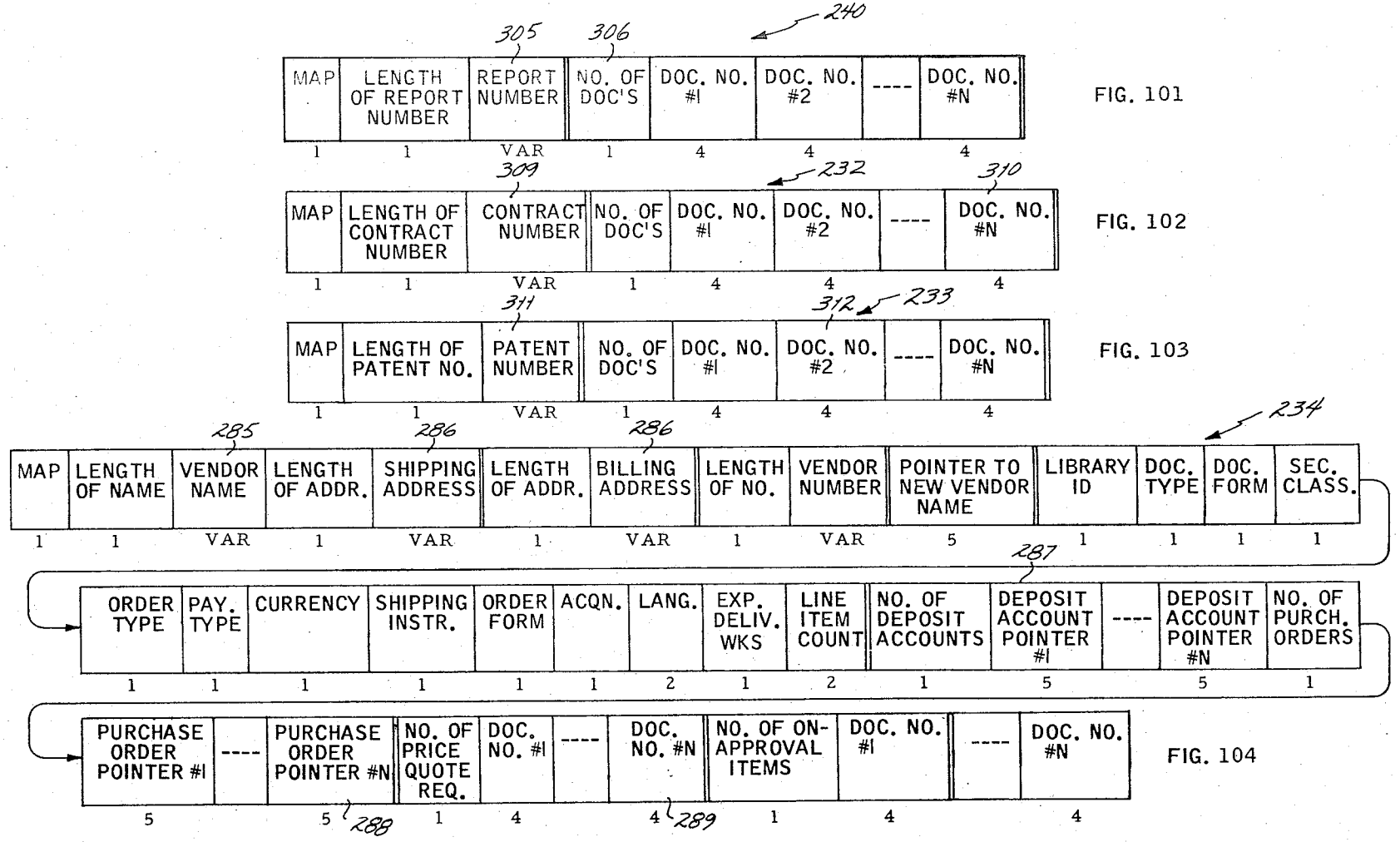
FIG. 101
MAP
LENGTH OF REPORT NUMBER
REPORT NUMBER
NO. OF DOC'S
DOC. NO. #1
DOC. NO. #2
---
DOC. NO. #N
240
305
306
309
232
310
FIG. 102
MAP
LENGTH OF CONTRACT NUMBER
CONTRACT NUMBER
NO. OF DOC'S
DOC. NO. #1
DOC. NO. #2
---
DOC. NO. #N
311
312
233
FIG. 103
MAP
LENGTH OF PATENT NO.
PATENT NUMBER
NO. OF DOC'S
DOC. NO. #1
DOC. NO. #2
---
DOC. NO. #N
234
285
286
287
288
289
MAP
LENGTH OF NAME
VENDOR NAME
LENGTH OF ADDR.
CURRENCY
SHIPPING INSTR.
SHIPPING ADDRESS
LENGTH OF ADDR.
BILLING ADDRESS
LENGTH OF NO.
VENDOR NUMBER
POINTER TO NEW VENDOR NAME
LIBRARY ID
DOC. TYPE
DOC. FORM
SEC. CLASS.
ORDER TYPE
PAY. TYPE
ORDER FORM
ACQN.
LANG.
EXP. DELIV. WKS
LINE ITEM COUNT
NO. OF DEPOSIT ACCOUNTS
DEPOSIT ACCOUNT POINTER #1
---
DEPOSIT ACCOUNT POINTER #N
NO. OF PURCH. ORDERS
PURCHASE ORDER POINTER #1
---
PURCHASE ORDER POINTER #N
NO. OF PRICE QUOTE REQ.
DOC. NO. #1
---
DOC. NO. #N
NO. OF ON-APPROVAL ITEMS
DOC. NO. #1
---
DOC. NO. #N
VAR
FIG. 104